US012623163B2

(12) United States Patent
Lesher

(10) Patent No.: US 12,623,163 B2
(45) Date of Patent: May 12, 2026

(54) APPARATUS AND METHOD OF OBTAINING POTABLE WATER FROM IMPURE WATER SOURCE

(71) Applicant: Gregory Dennis Lesher, Hinckley, UT (US)

(72) Inventor: Gregory Dennis Lesher, Hinckley, UT (US)

( * ) Notice: Subject to any disclaimer, the term of this patent is extended or adjusted under 35 U.S.C. 154(b) by 183 days.

(21) Appl. No.: 18/119,615

(22) Filed: Mar. 9, 2023

(65) Prior Publication Data

US 2024/0299862 A1 Sep. 12, 2024

(51) Int. Cl.
| | |
|---|---|
| C02F 1/04 | (2023.01) |
| B01D 1/00 | (2006.01) |
| B01D 5/00 | (2006.01) |
| C02F 1/14 | (2023.01) |
| F24C 9/00 | (2006.01) |
| F24C 13/00 | (2006.01) |
| F24S 20/30 | (2018.01) |

(52) U.S. Cl.
CPC ........... B01D 5/009 (2013.01); B01D 1/0035 (2013.01); B01D 1/0041 (2013.01); B01D 1/0082 (2013.01); B01D 5/0009 (2013.01); B01D 5/0015 (2013.01); B01D 5/006 (2013.01); C02F 1/043 (2013.01); C02F 1/048 (2013.01); C02F 1/14 (2013.01); F24C 9/00 (2013.01); F24C 13/00 (2013.01); F24S 20/30 (2018.05); C02F 2201/009 (2013.01)

(58) Field of Classification Search
CPC ............................ C02F 1/04–20; B01D 5/006
See application file for complete search history.

(56) References Cited

U.S. PATENT DOCUMENTS

| | | | | |
|---|---|---|---|---|
| 1,287,922 A | * | 12/1918 | Dunnam | B01D 5/0063 |
| | | | | 203/DIG. 17 |
| 1,789,670 A | * | 1/1931 | Cross | B01D 3/20 |
| | | | | 196/139 |
| 2,662,850 A | * | 12/1953 | Kraft | B01D 5/0036 |
| | | | | 165/145 |
| 2,782,150 A | * | 2/1957 | Stalcup | B01D 3/06 |
| | | | | 203/40 |
| 3,085,153 A | * | 4/1963 | Morgan | B01D 3/4238 |
| | | | | 250/343 |
| 3,197,387 A | * | 7/1965 | Lawrance | C02F 1/06 |
| | | | | 202/195 |
| 3,337,418 A | * | 8/1967 | Halacy, Jr. | C02F 1/18 |
| | | | | 52/2.21 |
| 3,501,381 A | * | 3/1970 | Delano | B01D 1/0005 |
| | | | | 202/83 |
| 3,527,675 A | * | 9/1970 | Bourland | B01D 1/0082 |
| | | | | 202/160 |

(Continued)

*Primary Examiner* — Jonathan Luke Pilcher

(57) ABSTRACT

Apparatus for obtaining potable water from an impure water source comprising a container having at least a first end wall, a second end wall, a first sidewall, a second sidewall and a top wall; a volume of the impure water; a heater device for heating the volume of impure water to produce gaseous water molecules; a condensing system located inside the container for providing water condensate from the water molecules; an outlet for providing a flow of potable water from the water condensate; and a collection device for collecting the water condensate and moving the water condensate towards the outlet.

24 Claims, 21 Drawing Sheets

(56)                    References Cited

U.S. PATENT DOCUMENTS

| | | | | |
|---|---|---|---|---|
| 3,775,257 A | * | 11/1973 | Lovrich | .................... C02F 1/14 |
| | | | | 202/202 |
| 10,093,553 B1 | * | 10/2018 | Stefan | .................... B01D 5/006 |
| 2024/0002259 A1 | * | 1/2024 | Hoff | ....................... B01D 5/009 |

* cited by examiner

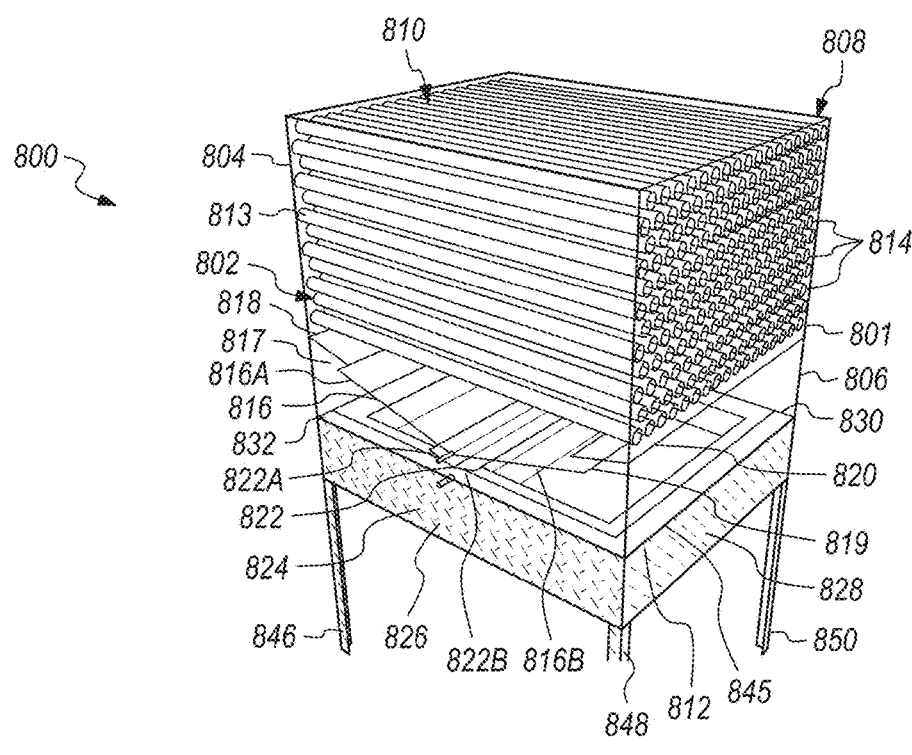
FIG. 8A(1)
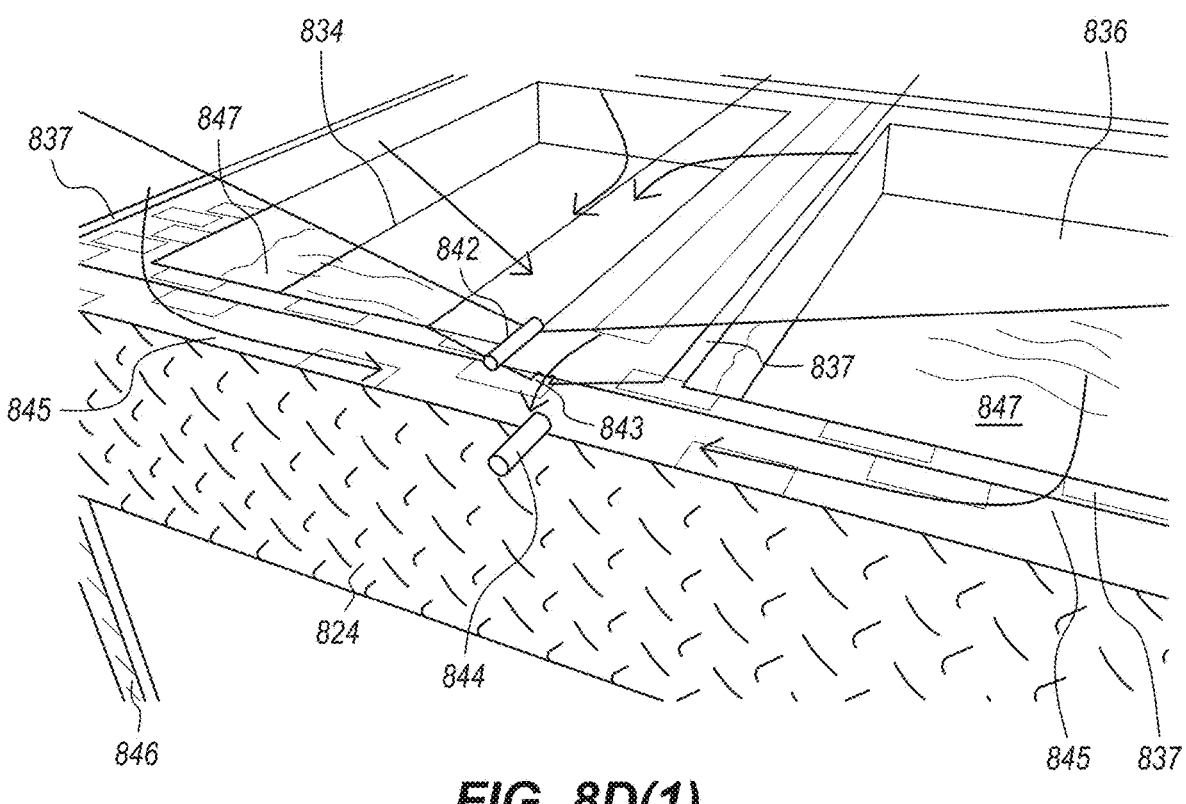
FIG. 8D(1)

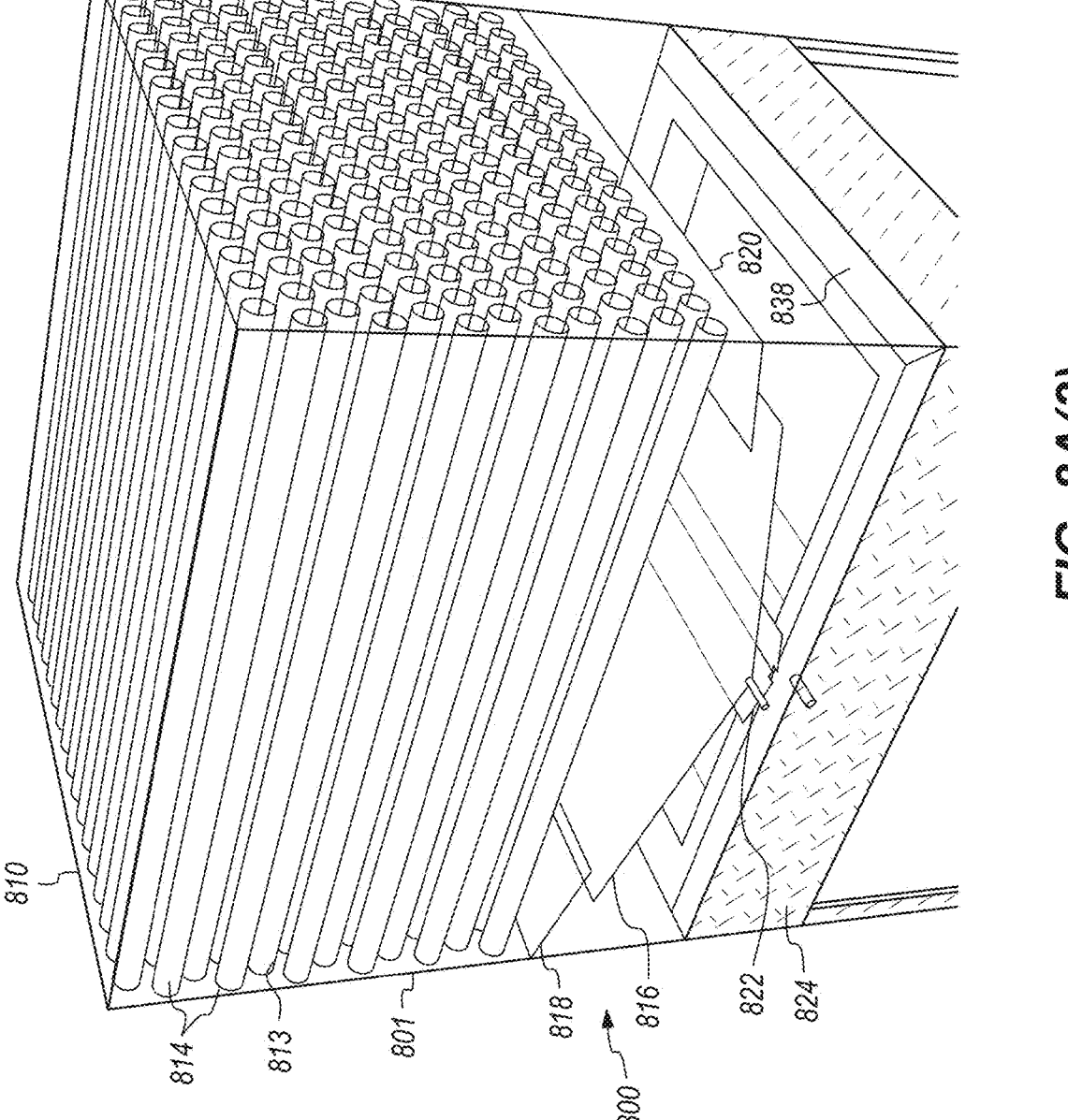
FIG. 8A(2)

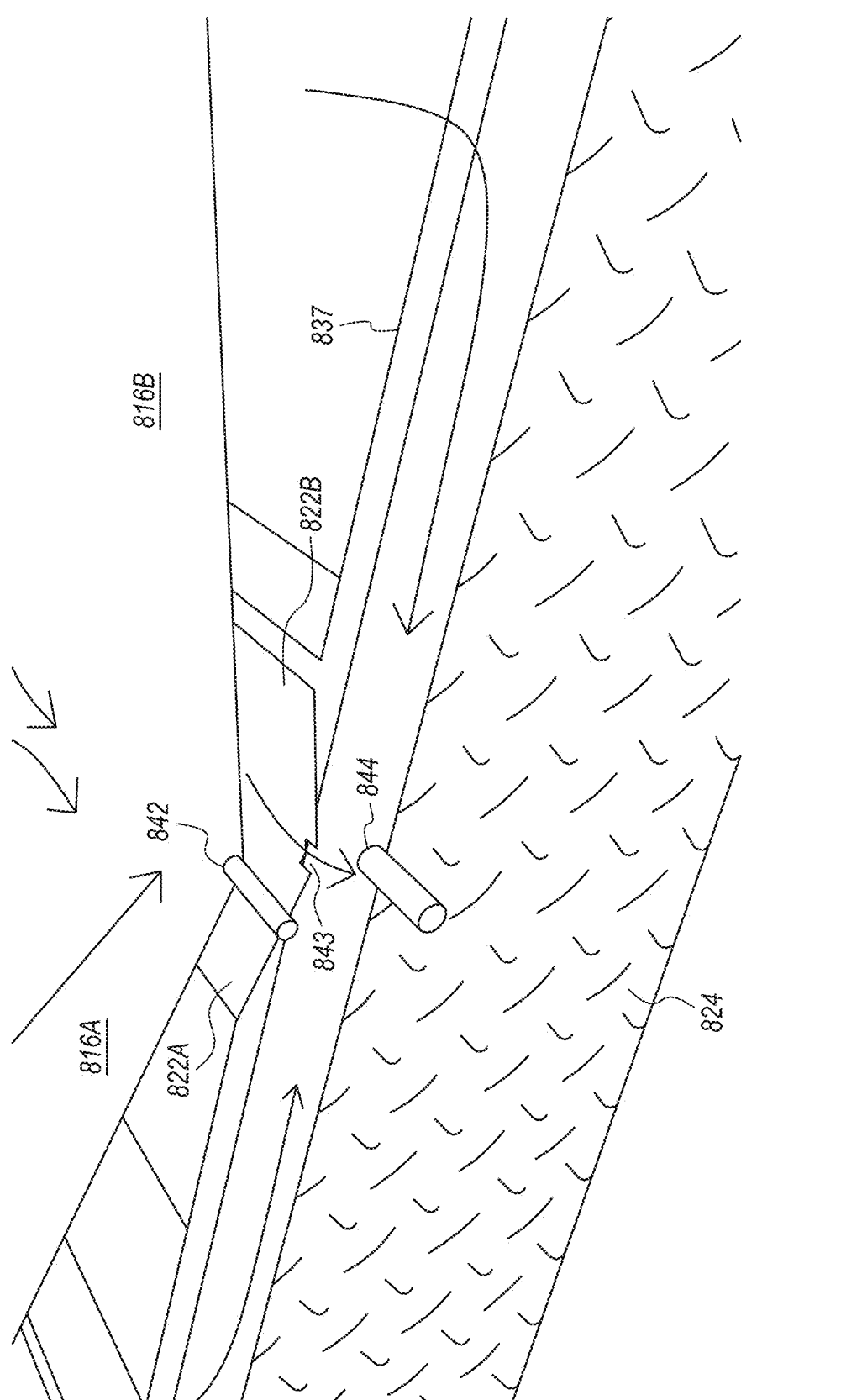
FIG. 8D(2)

FIG. 8C(1)

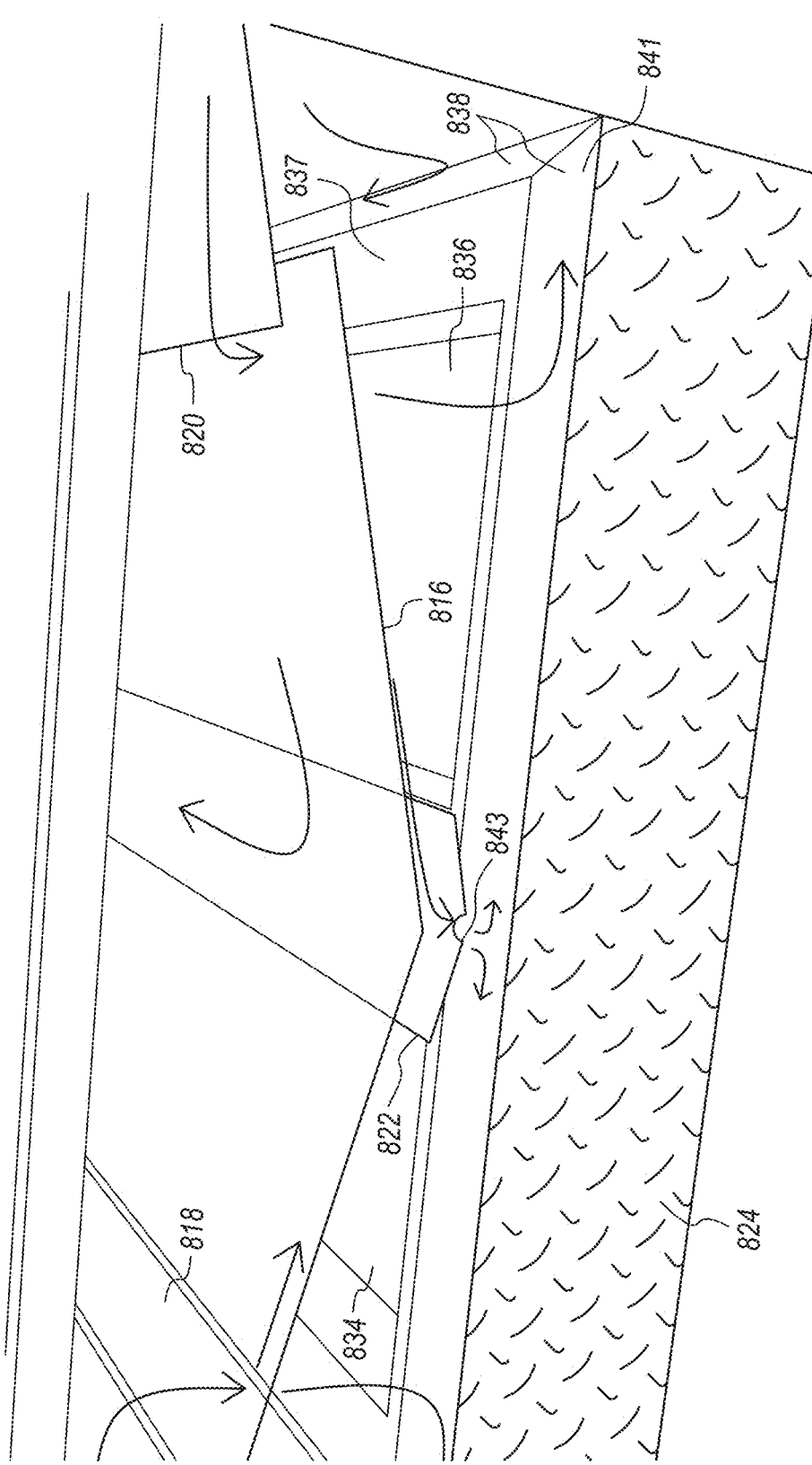
FIG. 8C(2)

1

APPARATUS AND METHOD OF OBTAINING POTABLE WATER FROM IMPURE WATER SOURCE

BACKGROUND

The process of obtaining drinkable water, which is potable water, from sources of impure water has been around for many years. This includes systems that rely on solar heating of the source of the impure water which condenses and then that condensed water is stored in a separate storage container for later use.

Distillation has for many years been considered a method of making salt water drinkable by obtaining purified water in remote locations where sources of fresh water are sparse or non-existent. Solar distillation uses the sun's heat directly in a simple piece of equipment that is used to purify water. The equipment, which is commonly called a solar still, consists of a shallow receptacle which holds the impure water and also a transparent glass cover. The sun heats the impure water in the receptacle which causes evaporation. As the evaporated water or moisture rises it condenses on the glass cover and then runs down that glass cover which is usually angled into a collector. The fresh water is collected in the collector and leaves behind all of the salts, minerals, and other impurities such as microorganisms in the original shallow receptacle. Current methods of solar desalination have been too costly to use on a large-scale operation for the average person due to size limitations of current technology.

Due to the design of the abovementioned solar still, the single basin of the solar still is limited in size due to the slanted glass cover or collection surface. Once the distillate has formed on the collection surface, it becomes heavy and travels down the glass or plastic surface, and if the still is a larger scale, the droplets become so heavy that gravity takes over and the droplets fall back into the source of impure water. For this reason, the size of the collection surface is limited to keeping the droplets from the collection surface from becoming too heavy before it can be collected into a trough or collector at the bottom end of the collection surface. Thus the ability to produce greater amounts of purified water is limited and can only produce enough for a person to survive or even less.

Reverse osmosis (RO) is a power-hungry method of producing pure water, however it requires flushing out ceramic filters and removing highly concentrated salt water which is to generally flushed back into the ocean. RO is not an environmentally friendly solution and is an expensive process. Power plants have been created just to provide the requirements for such RO systems.

Other methods used to obtain potable water from impure water use materials such as felt in order to wick the water up and is black in colour to help heat the water. This has drawbacks in that salt crystallisation forms on the material making it a difficult surface to keep clean.

One particular desalination process is called multi-stage flash distillation or MSF. This is a process that relies on creating a vacuum so that the impure water boils at a lower temperature and in theory requires less energy to do this. However the whole process requires the flashing of a portion of water into steam in multiple stages of heat exchanges. This process tends to be inefficient and very costly to perform.

Another system or process of distilling impure water involves a complex series of passes of salt water through multiple panels to extract about 30%-50% distilled water each time. The impure water goes through one set of panels and then onto another set of panels. Each time it goes through one set of panels there is less water to evaporate. The apparatus used in such a process is cumbersome, expensive, and difficult to set up particularly in remote areas where there is little or no water.

According to a first aspect of the invention, there is provided apparatus for obtaining potable water from an impure water source comprising:

a container having at least a first end wall, a second end wall, a first sidewall, a second sidewall and a top wall;

a volume of the impure water;

a heater device for heating the volume of impure water to produce gaseous water molecules;

a condensing system located inside the container for providing water condensate from the water molecules;

an outlet for providing a flow of potable water from the water condensate; and a collection device for collecting the water condensate and moving the water condensate towards the outlet.

The apparatus may further comprise one or more receptacles for storing the volume of impure water. The one or more receptacles are preferably located underneath the container or in a lower part of the container.

Preferably the condensing system is located in an upper part of the container. The condensing system may comprise a plurality of conduits; each conduit spaced apart from other conduits and adapted to have an outer surface area of each conduit form the condensate. In an embodiment, the plurality of conduits is tubes that are parallel and extend in one direction between the first and second end walls or between the first and second sidewalls of the container.

Preferably the condensing system is a plurality of sheets or panels arranged horizontally in the upper half of the container. In an embodiment, the condensing system and the collection device is the plurality of sheets, each sheet in the plurality of sheets being angled downwardly towards a central portion of each sheet, such that condensate on a top surface of each sheet moves under gravity towards the central portion. The apparatus may further comprise a vertical pipe located at the central portion and that extends through each the sheet, the pipe having openings to receive the condensate from respective sheets. Preferably a downpipe collects the condensed water from the plurality of sheets or panels, the downpipe having openings at or around where the downpipe meets each sheet or panel.

Preferably the collection device is located between the condensing system and the volume of impure water to collect condensate that falls from the condensing system. Preferably the collection device is angled downwardly towards a central part of the collection device, so as to direct the condensate towards the outlet.

The apparatus may further comprise a first ledge extending downwardly from the first sidewall and a second ledge extending downwardly from the second sidewall, the first and second ledges positioned between the condensing system and the collection device, the first and second ledges adapted to collect any condensate from upper parts of the first and second sidewalls or from the periphery of the condensing system, and to then direct the condensate onto the collection device.

The apparatus may further comprise another collection device positioned between the collection device and the volume of impure water, the second collection device adapted to collect condensate that falls from an underneath surface of the collection device. The second collection device may be angled downwardly towards a central part of collection device, so as to direct the condensate towards a further outlet.

The collection device and another collection device are preferably angled downwardly, preferably in a V-shape, from one of the first or second ends of the container.

The one or more receptacles may be located underneath the container and is part of a base portion of the apparatus. Preferably, the one or more receptacles are a series of trays, the trays being arranged in stacks and/or in rows or columns within a lower part of the container. The one or more receptacles are preferably heated by a heat transfer fluid, such as oil, which resides in a chamber at the bottom of the receptacle means, the heat transfer fluid being at a temperature above the boiling point of the impure water. The receptacles may be heated by an electrical heating element or elements that exceed the boiling point of the impure water, like PTC ceramic heating elements, and can be powered by photovoltaic or grid tie power systems.

The apparatus may further comprise a sensor to sense the amount of residual impurities, such as salt, in the one or more receptacles before saturation occurs in the container, such that if the concentration of remaining impurities is too high, then such impurities are removed from the one or more receptacles.

Preferably, the plurality of conduits is cooled by cool air from an air conditioning source passing through the inside of each conduit.

The condensing system may have separate materials applied thereto, which are hydrophilic and hydrophobic.

The top wall of the container may be used to collect rain water, the rainwater being delivered to a water storage vessel through a separate pipe or through a downpipe used to collect condensed water from the condensing system inside the container.

According to a second aspect of the invention, there is provided a method of obtaining potable water from an impure water source comprising the steps of:

providing a container having at least a first end wall, a second end wall, a first sidewall, a second sidewall and a top wall;
  heating a volume of impure water to produce gaseous water molecules;
  condensing the gaseous water molecules onto the surface or surfaces of a condensing system to produce water condensate;
  providing an outlet for a flow of potable water from the water condensate; and
  collecting the water condensate; and
  moving the water condensate towards the outlet.

According to a third aspect of the invention, there is provided apparatus for cooking and for obtaining potable water from an impure water source, comprising:

a cooking portion;
  a condenser portion integrally formed with the cooking portion;
    the condenser portion having:
      a container having at least a first end wall, a second end wall, a first sidewall, a second sidewall and a top wall;
  a heater device for heating a volume of impure water to produce gaseous water molecules;
  a condensing system located inside the container for providing water condensate from the water molecules;
  an outlet for providing a flow of potable water from the water condensate; and a collection device for collecting the water condensate and moving the water condensate towards the outlet.

The cooking portion preferably derives heat from the sun to enable the cooking portion to be used for cooking. The cooking preferably portion has a base portion having a plurality of channels storing a heat transfer fluid therein that extend from said cooking portion to said condenser portion, such that when said base portion is heated, said heat transfer fluid transfers heat to said condenser portion, and when the fluid reaches a predetermined temperature evaporation of the impure water volume occurs.

BRIEF DESCRIPTION OF THE DRAWINGS

A preferred embodiment of the invention will be hereinafter described, by way of example only, with reference to the drawings in which:

FIGS. 8A(1) and 8A(2) are perspective views of apparatus for removing water from an impure water source according to a further embodiment of the invention;

FIGS. 8C(1) and 8C(2) are enlarged views of a second end of the apparatus of FIGS. 8A(1) and 8A(2) showing first and second water collecting devices;

FIGS. 8D(1) and 8D(2) are enlarged views of a first end of the apparatus of FIGS. 8A(1) and 8A(2) showing first and second water collecting devices and outlets;

DETAILED DESCRIPTION OF THE PREFERRED EMBODIMENTS

Figure 1:
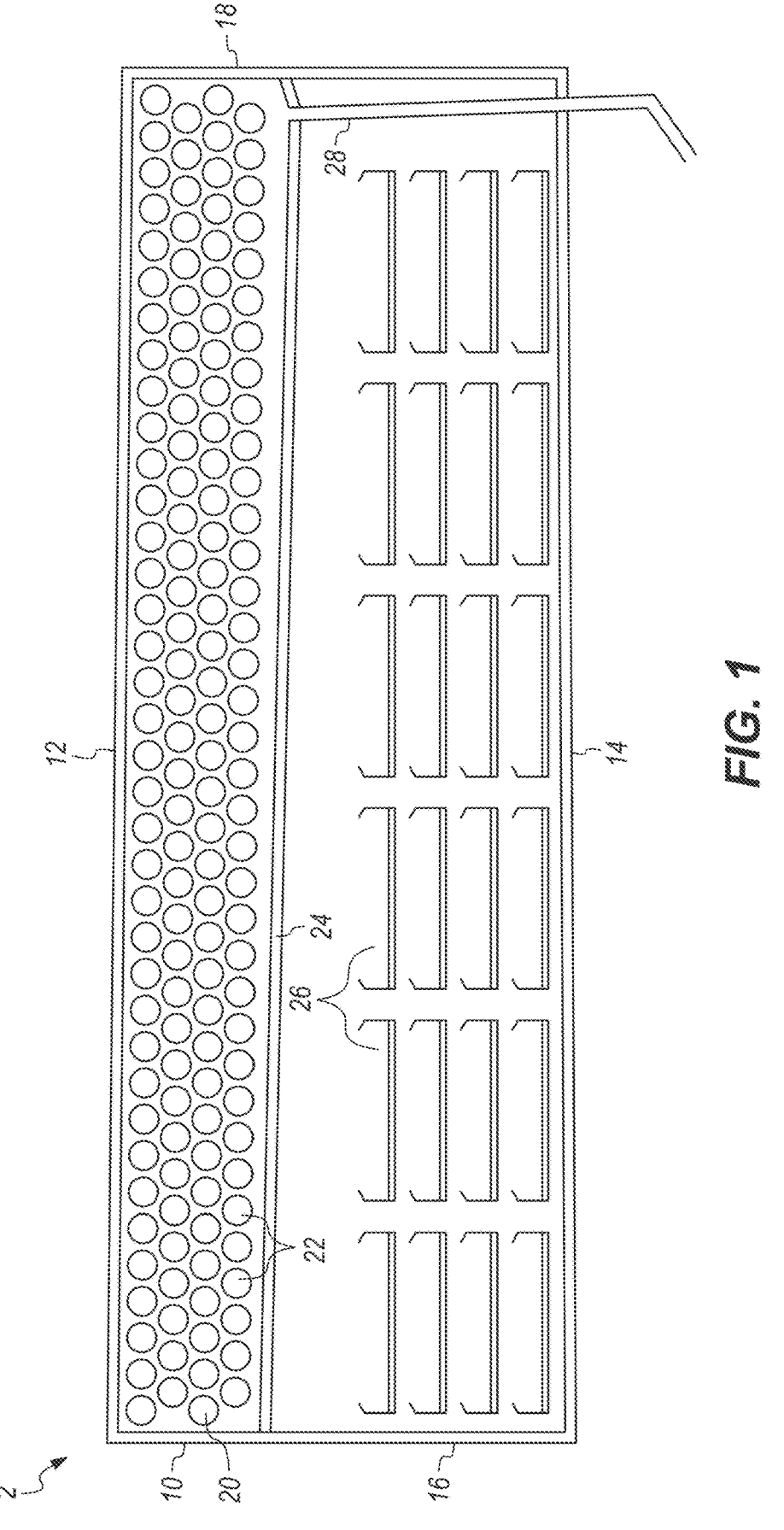
FIG. 1 is a side view of apparatus for removing water from an impure water source according to an embodiment of the invention.
Figures 2, 3:
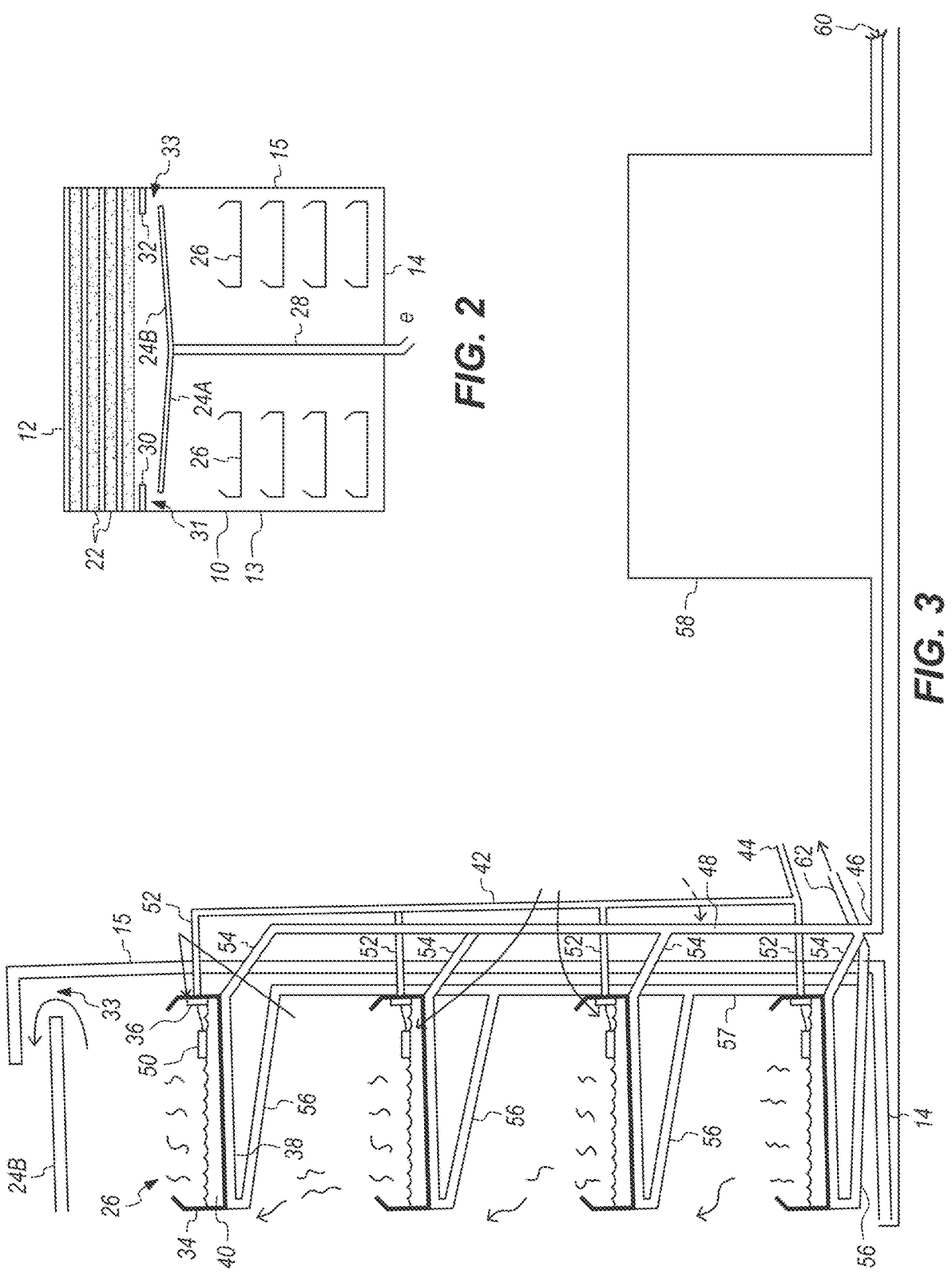
FIG. 2 is an end view of the apparatus of FIG. 1.
FIG. 3 is a side sectional view showing in greater detail receptacles or trays that hold impure water to be heated and evaporated.

With reference to FIGS. 1 and 2 there is shown apparatus 2 for obtaining potable water from an impure water source, using a distillation process. The apparatus 2 includes a container 10 that is fully sealed and has a top wall 12, a bottom wall 14, a first end wall 16, a second end wall 18, a first side wall 13, and a second side wall 15. The container 10 is preferably has a rigid heat resistant insulation to maintain the high temperatures. The end walls 16, 18 and side walls 13,15 (and bottom wall 14) of the container 10 can be made from concrete or cinder blocks, be framed walls insulated or not insulated, using standard building materials, glass/Plexiglas®, corrugated polycarbonate (greenhouse panels) or coated fabric or woven poly coated material/impregnated PVC material. The container 10 can be scaled to any required size for any particular application and depending on the population size it is to support.

The top wall 12, in this embodiment and other embodiments, can be covered with an inflatable chamber to fill with chilled air to enhance the condensation collection process. The top wall 12 can be fitted with a screen, in situations where rainwater is being collected, to reduce debris entering rainwater collectors such as downpipes and storage tanks. The top wall 12 can be framed with cables, metal, wood or plastic or supported in its centre with a spacer from a cross member on top of a distillate collection surface. FIG. 8(*a*) shows an example of this. The top wall 12 can be made with a rigid polycarbonate, corrugated semi-transparent or transparent cover. It can also be made with a Plexiglas® distillate collection surface or glass. All such surfaces may be or may not be transparent.

The bottom wall 14 can be fitted with conduits or piping to transfer heated liquid material for boiling or simmering the contaminated, impure water for faster evaporation. The bottom wall 14 can be lined as a pond liner of any coated material to hold and contain the impure water for evaporation. The impure water can be pumped into a tray, receptacle, or holding vessel and adjusted to the desired depth using a float valve. Alternatively, the impure water can be poured by hand.

Located towards the upper interior portions of the container 10 is a condensing system 20 for condensing water that has evaporated from a series of receptacles or trays 26 located in the lower half of the container 10. The condensing system 20 is made up of a plurality of conduits 22 in the form of cylindrical tubes or pipes that are positioned and aligned in the same direction. Each of the tubes 22 has space between it and adjacent tubes 22 to receive air flow and gaseous water molecules, and overall present a large surface area on which to form condensation of the water molecules.

The container is approximately 20 feet or 6.096 meters in length, 8 feet in width and 8 feet in height or 2.4384 meters in height and width. Each of the tubes or pipes 22 are made from any one of the following materials including plastic, metal such as stainless steel, copper, glass or polycarbonate such as PVC. Each of the tubes is about 4 inches (0.1016 meters) in diameter and each are spaced apart by about one inch (0.0254 meters).

Located directly below each of the tubes and pipes 22 is a collection device 24 which provides a platform onto which condensed water drops fall from each of the tubes 22. The collection device 24 can be a 1 to 2 inch (0.0254 to 0.0508 meters) thick polyurethane insulation covered by fiberglass or a stainless steel coating. It is angled downwardly towards the second end 18 of container 10 for collection through a downpipe 28 which is positioned substantially vertically and directs the collected water drops into a storage container (not shown) for storage of clean fresh water. As seen from the end view in FIG. 2 the tube or pipe 28 is located adjacent the middle of the second end 18 and the collection device 24 is split into first section 24A and second section 24B which are both angled downwardly towards the tube 28.

Each of the trays or receptacles 26 are affixed so that they are aligned or stacked (one on top of the other) in a series of columns. In this particular example there are six columns of trays with four trays in each column in two sections of the lower part of container 10, making a total number of 48 trays. This is more clearly seen in FIG. 2 where there are two rows of such trays 26. The trays 26 can be made from stainless steel (to offset any corrosion from salt water for example) and are approximately 3 feet square (0.9144 meters square) and about 3 to 4 inches (0.0762 to 0.1016 meters) in height of first and second side walls 34, 36 and have angled top portions in order to stop splashing of the impure water. The receptacles 26 may have a single integral side wall joined to a bottom wall.

A pair of downwardly depending ledges being first ledge 30 and second ledge 32 extend inwardly into the interior of container 10 from respective sides 13 and 15, and between end walls 16 and 18, to create respective openings 31 and 33 for the evaporated water from the trays 26 to travel upwardly to collect and condense on the tubes 22. Cool air is provided from another source to be fed into and blown inside each of the hollow tubes 22 in order to assist the process in condensing the gaseous water molecules.

The contaminated water is eventually evaporated on each tray 26, travels upwardly, and can extend around and through the openings 31 and 33 to be deposited, from a gaseous state, onto the condensing system 20 in a liquid state.

Referring to FIG. 3, there is shown a partial view of a column of the trays 26. The trays 26 are positioned one on top of the other and in this case there are four such trays 26 shown. Main inlet 44, first vertical feed pipe 42, and first set of inlet pipes 52 to each of the respective trays 26 have heated impure water 40, such as sea water, fed through them and into the stainless steel trays 26 ready for evaporation. The unpotable or impure water 40 can be any one of seawater, brackish water, ground (bore) water, sewage, toxic waste water, grey water, or swamp water. The impure water 40 is heated through a series of flat panel solar collectors. A float valve 50 in each of the trays 26 maintains the impure water level 34 therein so that no excess water is present in the trays 26 at any one time. Thus, the control of the level of the body of impure water 40 is maintained and then flushed out by electronic control drain valves when saturation occurs, or by specific gravity float valves in the case of saline content. Once the saline saturation is reached within the system, as detected by sensor unit 59 (FIG. 4A), the trays 26 are flushed through an electronically controlled drain/flush valve to remove the deposits, particularly salt, into an external collection pond 92 (FIG. 7) for the collection of the salt and the impurities. Each of the feed lines such as vertical feed pipe 42 and the inlet pipes 52 and second vertical feed pipe 48, second set of inlet pipes 54, are insulated in order to have maximum retention of the heated fluid that is entering each of the trays 26.

Located at an underneath side of each tray 26 is a container 38 which is about a quarter of inch (6 mm to 8 mm) deep and extends across the whole surface of the bottom of the tray 26. Shallow container 38 is for heated oil (or a heat transfer fluid, hereafter referred to as heated oil or oil) to reside and heat the contaminated water 40 in order to evaporate the contaminated water 40. The oil, having a high flash point, is heated to a temperature above the boiling point of the contaminated water and is pumped, via oil pumps, through each of the shallow containers 38 of each tray 26 so that it is at a simmering or boiling point temperature to evaporate the contaminated water 40. The heated oil is stored in a heavy insulated tank 58, after being input to inlet 60 where the oil was previously heated from a collection of solar collector panels. The heated oil is input through outlet pipe 46 and up through second vertical pipe 48 and to each of the container 38 through the second set of inlet pipes 54.

The oil returns to the heated oil storage tank 58 through a series of pipes, firstly the outlet pipes 56 and then through the vertical downpipe 57 and through outlet 62. Thus, the oil is returned to the flat plate solar collectors, or to parabolic mirrors with reflected sunlight onto black pipe, or to a parabolic reflected mirror dish that uses solar tracking, focused on a coiled tube encased in a metal block, in order to be reheated. The temperatures of the oil can be maintained through natural gas if there is not sufficient sunlight to heat the oil through the solar collector panels, or by solar off tracking. The same situation applies to the reheating of the contaminated water. This can be done by natural gas or current solar methods already in use today. The receptacles 26 may alternatively be heated by an electrical heating element or elements that exceed the boiling point of the impure water, like PTC ceramic heating elements, and can be powered by photovoltaic or grid tie power systems.

Figure 4A:
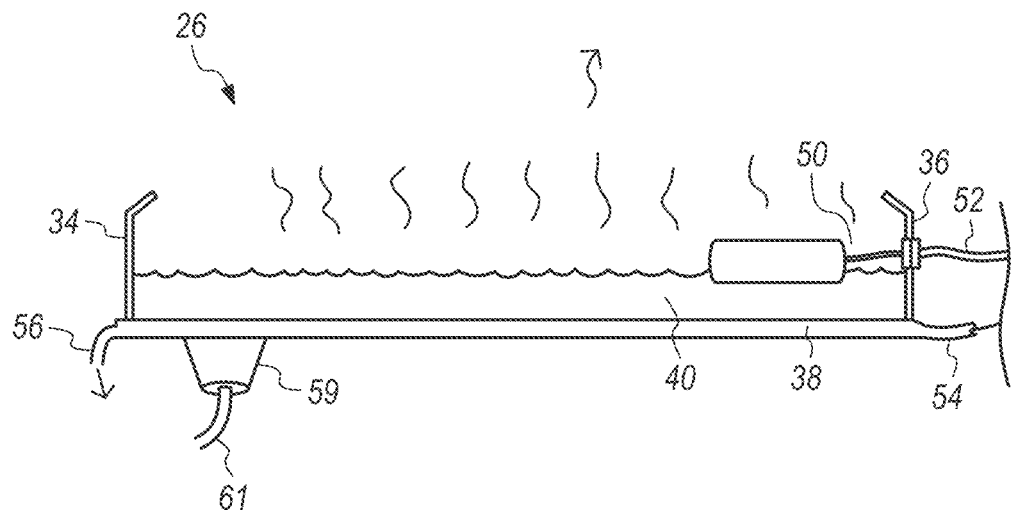
FIG. 4A is an enlarged view of one of the receptacles or trays in FIG. 3.
Figure 4B:
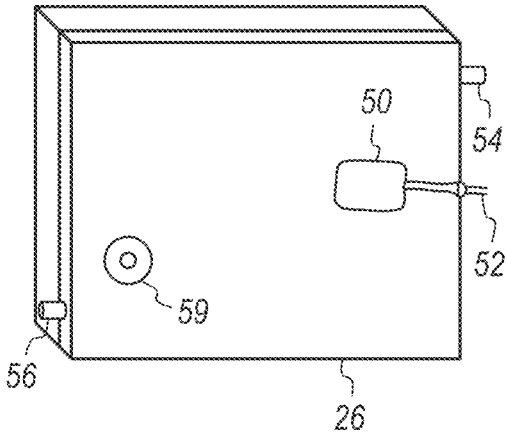
FIG. 4B is a bottom perspective view of the tray of the FIG. 4A.

Referring to FIGS. 4A and 4B, there are further views of one of the trays 26 in more detail. In particular there is shown a sensor unit 59 which senses the amount of impurities, such as salt, that is left within the body of the impure water 40 or detects saturation within the apparatus 2. If the amount of impurities is too high, the impurities are then flushed away through the sensor unit outlet 61. The return of oil to be reheated or stored in insulated tank 58 can be used for night time functions of the boiling or simmering of the contaminated water in the trays 26, provided there is enough heat within the body of the oil. In FIG. 4B it is seen that the inlet pipe 54 is diagonally opposite the outlet pipe 56 for the oil.

Figure 5A:
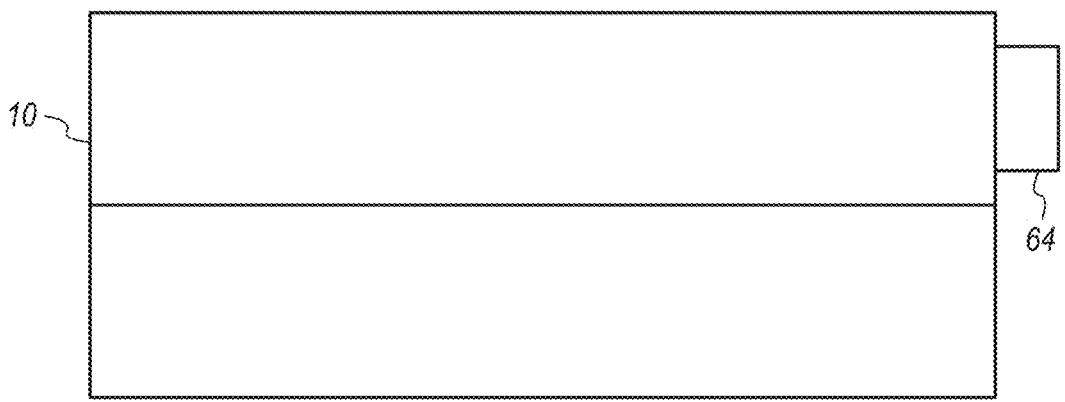
FIG. 5A is a side view of an air conditioning flow chamber which is attached to the side of the apparatus of FIG. 1.
Figure 5B:
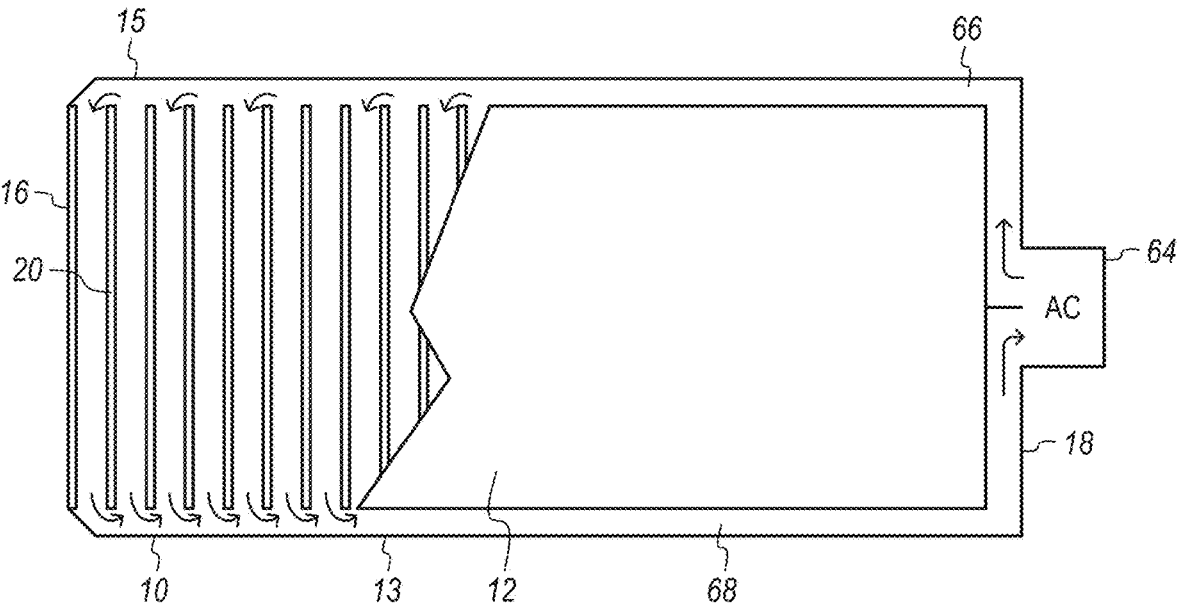
FIG. 5B is a partly cut away top view of the apparatus or container used in FIG. 1 showing the cool air from the air conditioning flow chamber of FIG. 5A.

Referring to FIGS. 5A and 5B, there are shown a side view and a top view of the container 10 from FIG. 1 showing an air conditioning unit 64, in particular, a solar powered air conditioning unit, which provides, through appropriately fitted ducting, cooled air inside each of the tubes 22 as seen in FIG. 5B. The air is directed alongside the inner parts of the sides of the container 10 through passage 66 adjacent side 15 and passage 68 adjacent side 13 (as seen by the direction of the arrows) to then flow inside the tubes 22. This assists in the condensation of the evaporated water from each of the trays 26 as it provides a cooled surface inside each of the tubes 22.

In addition, each of the tubes 22 will become heavy with distillate and as a result the water will drip down to the collection device 24. Each of the passages 66 and 68 are about 4-6 inches (10-15 mm) in width.

Figure 6A:
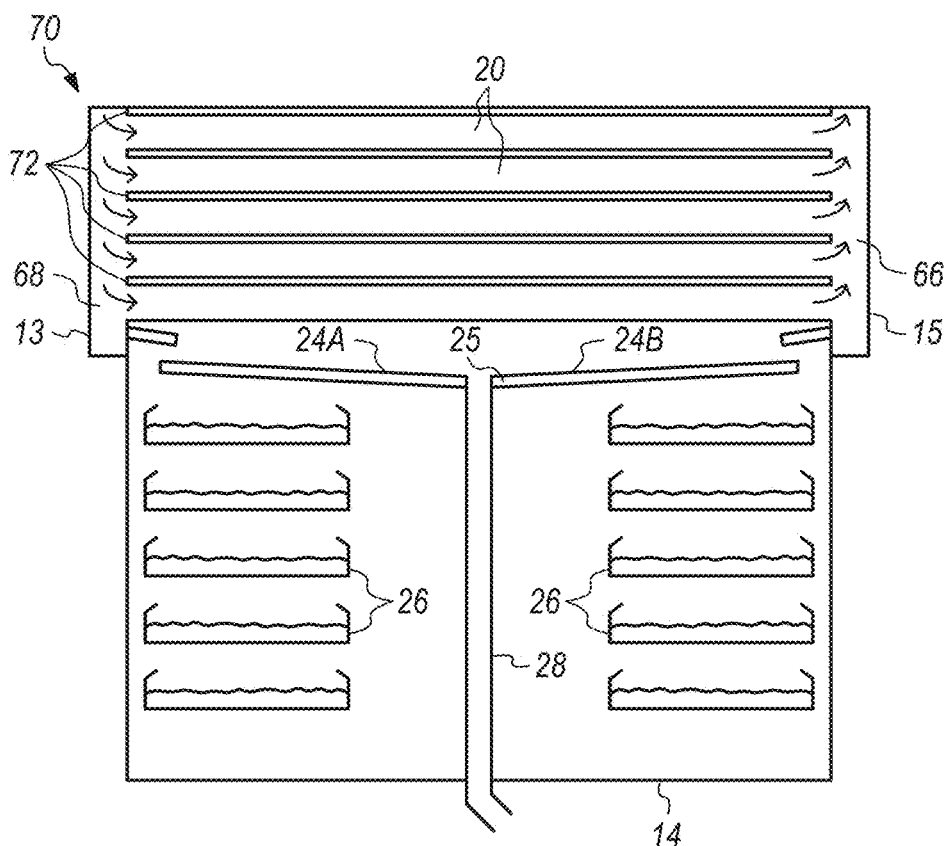
FIG. 6A is an end view of the apparatus similar to that shown in FIG. 2.
Figure 6B:
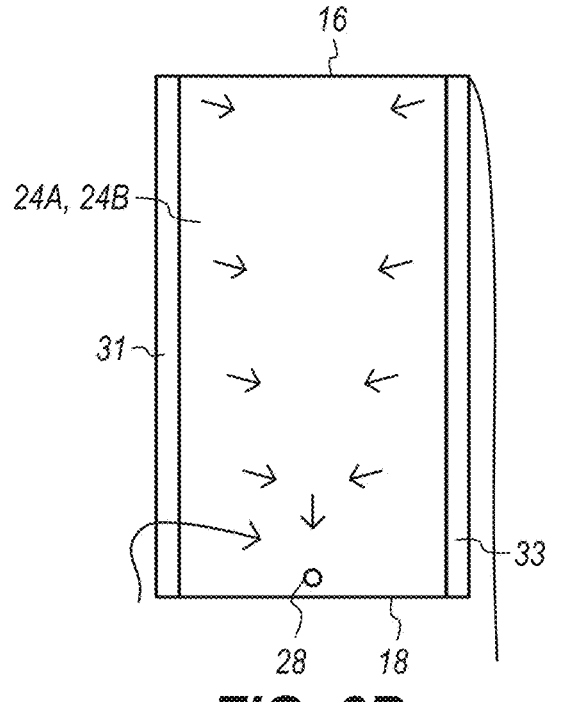
FIG. 6B is a top view of a distillate collection surface used in the apparatus of FIG. 6A.

Shown in FIGS. 6A and 6B there is a container 70 that has a set of spaces 72 that allow the flow of condensation to collect on the outside of tubes 22 or collection surfaces, that are preferably made of PVC or approved potable water surface material as described. With the condensation being able to drip or flow from above and beneath the tubes 22, this allows the flow in the condensation process where water is evaporated from each of the trays 26 as before. Passages 66 and 68 are located on the inner parts of the container 70, adjacent sides 13 and 15, to allow for the cooled or chilled air or even a chilled fluid to flow inside each of the tubes 22. Beneath the set of spaces 72 is a collection device 24 for collecting the condensed water and is in the form of a suspended insulated surface which is on a slight angle from one end of the container 70 to the other. It is split into two parts 24A and 24B that are angled towards each other, in a V-shape, to a central part 25 of the collection device 24 and, as mentioned is angled from one end so that the water after dripping down from the tubes 22 onto the collection device sections 24A and 24B is fed to an exit pipe 28 located at end 18 as is shown in FIG. 6B. The surfaces of first and second sections 24A and 24B can be coated with a hydrophobic material in order to allow the quick delivery of fresh water to the exit pipe 28. Drip edges around the periphery of the first and second sections 24 A and 24B can also be used to prevent loss of any distillate or condensate (water droplets resulting from the distillation or condensation process) as it falls from the walls of the container or droplets of condensate near the edges or airflow gaps, such as at passages 66 and 68, onto the condensate sections 24A and 24B. This is to prevent any condensation that would fall into any of the evaporation trays 26.

Figure 7:
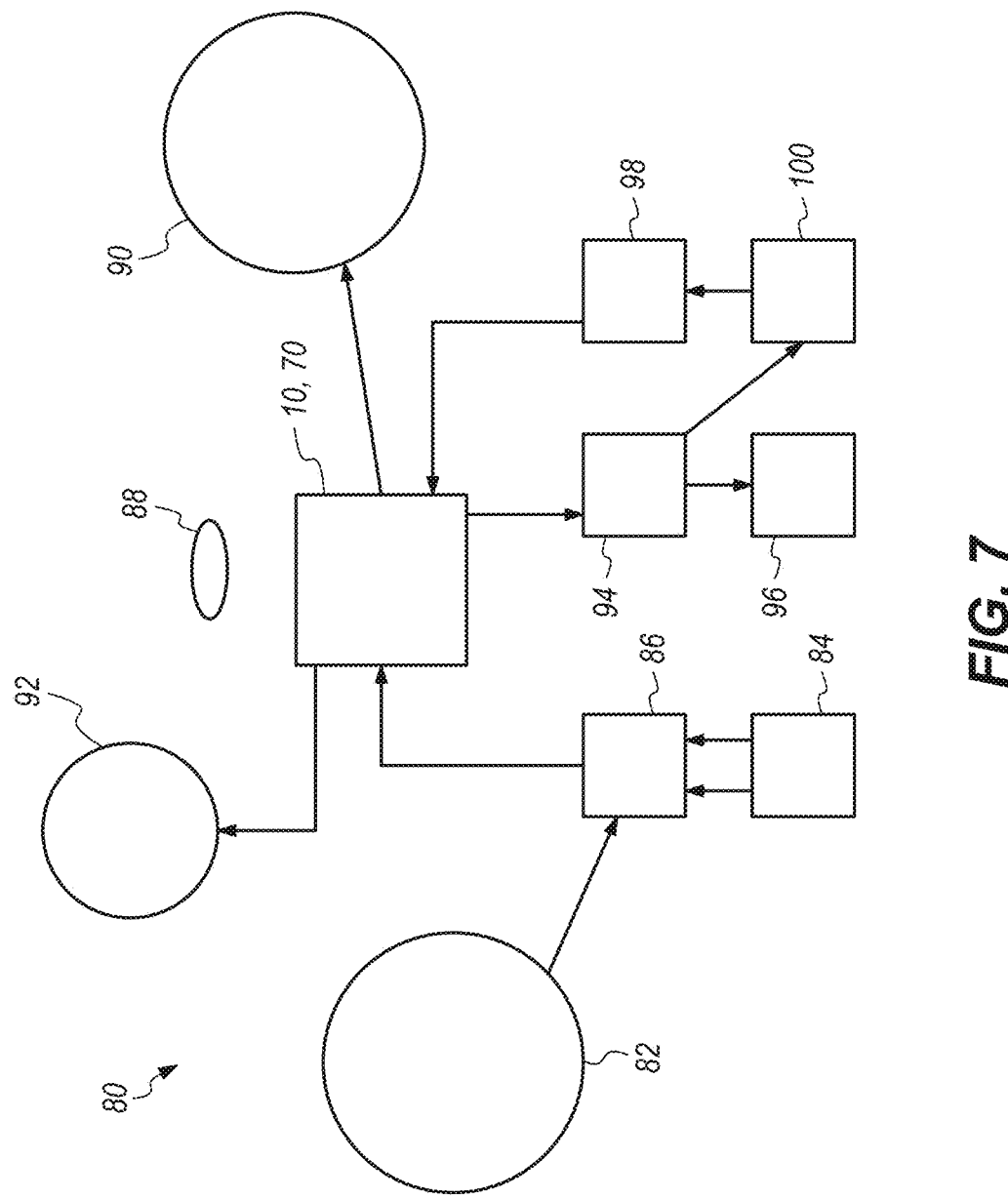
FIG. 7 is a block diagram showing all of the various components of a system that uses the apparatus of FIG. 1.

Referring to FIG. 7 there is shown an overall schematic diagram 80 of the system and process. The compromised or impure water, typically sea water, is stored in reservoir 82 where it is then pumped, via water pumps, or distributed to enter vessel 86 which is preheated by a solar preheating array 84. The heated water in vessel 86 is then input to the desalination apparatus containers 10 or 70 as described before. Heated oil is also input to heat the trays 26 of the desalination apparatus 10 or 70 from the collectors 98. Any returning oil from desalination apparatus containers 10, 70 goes through a flat plate solar collection array 94, or the other solar heating methods previously mentioned, for further heating and this is collected in the collectors at 96. Alternatively, if the oil has enough heat, it can be stored overnight or at times when there is little or no sun and then used at night time. A heated oil storage facility 100 is used as a back-up heating source where, for example, the solar systems cannot be used due to lower levels of sunshine. Propane or natural gas can be used as an alternative heat source in such cases. The purified water from containers 10, 70 is stored in and distributed from water storage facility 90 after being processed through the desalination apparatus 10, 70. After saturation and the impurities are flushed out from the trays 26, they are collected in an evaporation pond and salt collection area 92, which can be lined. Any pumping for the systems can be done using photovoltaic energy or solar energy using pumps 88. Such pumps can be used to pump the sea water to the preheating solar array 84, for pumping the oil to and from the desalination apparatus 10, 70. The pumps can also be used for pumping the impure water from reservoir 82 into the desalination apparatus 10, 70 and for pumping the purified water away from the desalination apparatus 10, 70 to be stored in storage facility 90. Furthermore, pumps can be used to pump out the impurities left behind in the trays 26 to the collection area 92. The PV system can be scaled to meet the requirements of pumping. Photovoltaic solar energy can be used to power the air conditioning over the condensation collector surfaces, such as pipes or tubes 22.

Figure 8B:
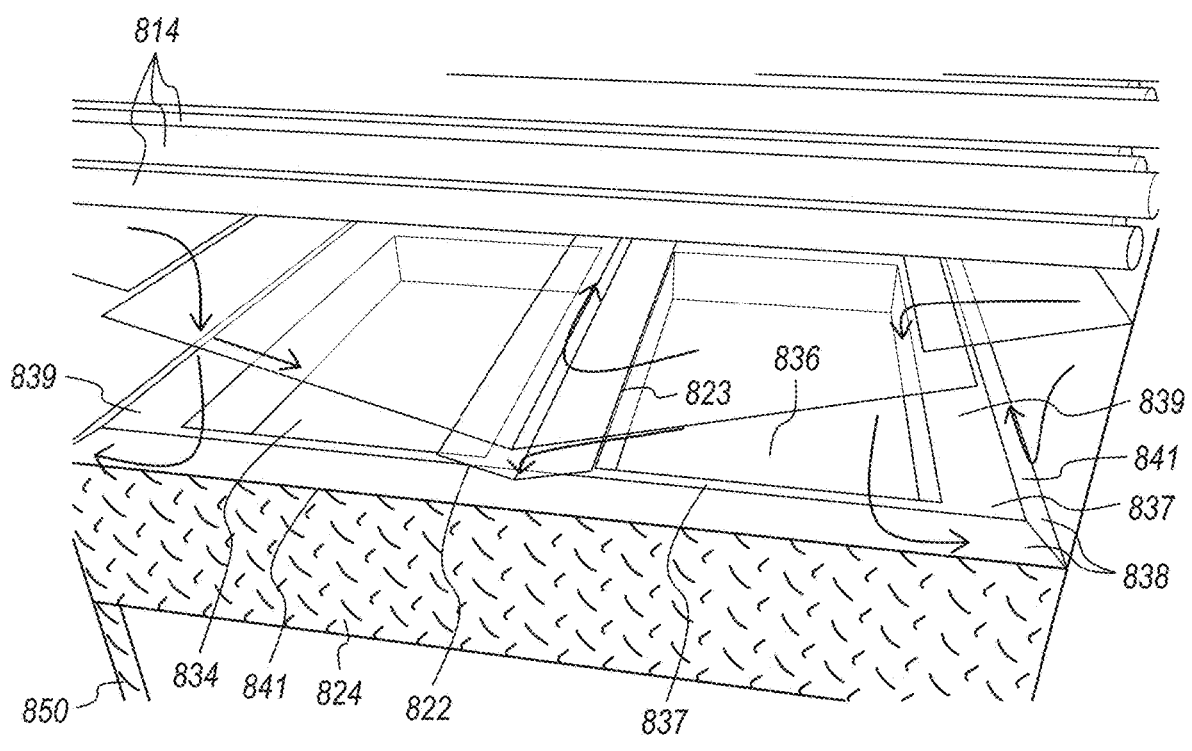
FIG. 8B is an enlarged view of part of one side of the apparatus in FIGS. 8A(1) and 8A(2)
Figure 8B:
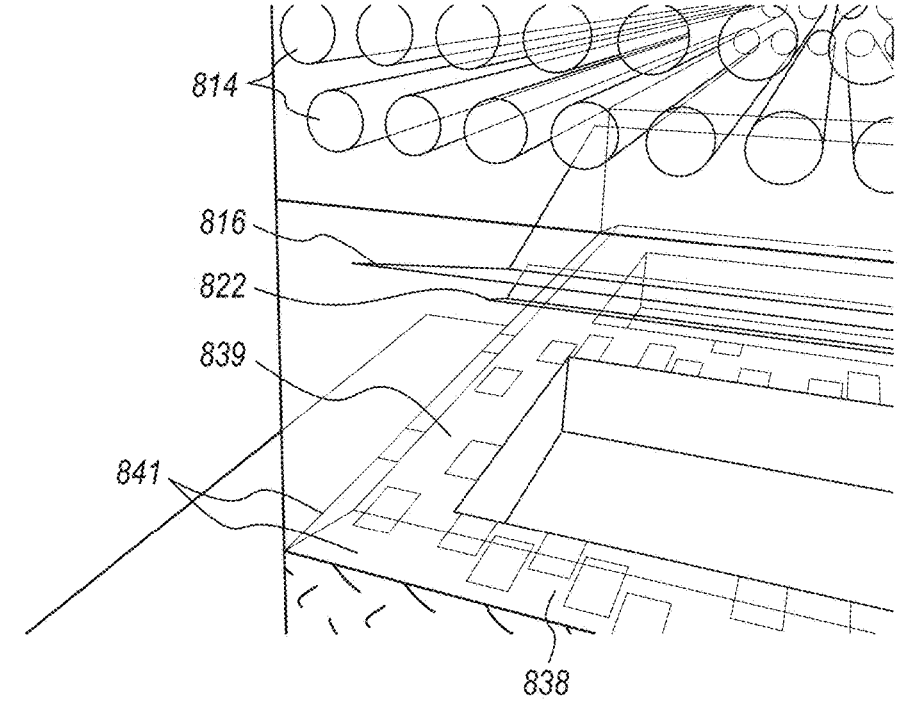

Shown in FIGS. 8A(1) and (2), FIG. 8B, FIGS. 8C(1) and (2), and FIGS. 8D(1) and (2) is a further embodiment of the invention which is an apparatus 800 for producing potable water from an impure water source as shown which has a sealed container portion 801 that is supported by a base unit 824 and further supported by a series of legs 846, 848, 850 and 852 (not shown).

The container 801 has first end wall 802, second end wall 808, first side wall 804 and second side wall 806, together with top wall 810 and bottom wall 812. The bottom wall 812 is affixed to a top portion of the base portion 824, which has first side 826, second side 828, third side 830, and fourth side 832. In some situations, there may be no need for a bottom wall 812, as the lower edges of the sidewalls 804, 806 and those of the end walls 802, 804 may directly contact the base portion 824. The base portion 824 has a pair of reservoirs 834 and 836. Located in an upper part of the container 801 is a condensing system 813 made of a series of parallel conduits in the form of a plurality of tubes 814 that are affixed to each of the side walls 804 and 806. Beneath the series of tubes 814 and above the base portion 824 is a first collection device 816 in the form first and second sections 816A and 816B that are angled to enable condensate to be collected and output through outlet 842. The first collection device 816 is on a small acute angle, angled downwardly, with respect to the container 801, from second end 808 towards outlet 842 at the first end 802. The outside edges of each section 816A and 816B are higher than the inner edge where the two sections join (or alternatively are made in a single piece). The first collection device 816 extends from first end 808 to second end 808, but has a first gap 818, adjacent first side 804, and a second gap 819 adjacent second side 806, to enable the evaporated water molecules to rise or move upwardly to the tubes 814.

A first ledge 818 and a second ledge 820 are respectively affixed to the first side 804 and second side 806 and are positioned above the first collection device 816 but beneath the lowest level of tubes 814. The combination of using ledges 818, 820 and first collection device 816, all angled downwardly towards base portion 824; ensure that no distillate or condensate falls into receptacles 834, 836.

A second (or another) collection device 822 is positioned beneath the first collection device 816 and is formed in two sections 822A and 822B which are also angled towards a middle portion where they each join and are angled downwardly. The width of the second collection device 822 is approximately the same as the width of an intermediate portion 823 that exists between the two reservoirs 834 and 836 (FIG. 8C). The second collection device 822 extends from the first end 808 to the second end 802. The second collection device 822 is designed to collect purified water from other parts within the container 801 which will be explained hereinafter.

The intermediate portion 823 together with surround 837, which surrounds the two reservoirs 834 and 836, does not extend all the way to the respective ends and sides of the container 801, but has a gap to allow an inclined face 838 that extends downwardly to the respective joins between the four sides of base portion 824 and where they meet the bottom edges of the first end 802, second end 808, first side 804 and second side 806. This defines a channel 841 and is designed to collect water droplets that are condensed on the lower inside surfaces of ends 802, 808 and sides 804 and 806.

The tubes 814 are preferably made from fiberglass, Lexan polycarbonate plastic, glass, or stainless steel. It provides more surface area for the gaseous water molecules to cool and condense. The arrangement also allows outside air to circulate through the tubes 814, keeping the surfaces of the tubes 814 cooler than the environment inside the container 801. A fan can be used from outside the container to blow air through the tubes 814, assisting in the condensation process.

In this embodiment the following parts are used to construct the apparatus 800.

1. 4×8 foot sheet of Plexiglas, ¼ inch.
2. Lexan florescent light protectors, 8 feet, 18 count.
3. Plexiglas cement (Tap Plastics) bonding agent.
4. Hole drill to match the Lexan tubes.
5. 2×6 6 feet long times 2 (frame).
6. Trays, 2 standard serving trays (stainless steel) restaurant quality.
7. Two Drains for flushing trays.
8. Tubing for drains and a solenoid valve 12 or 24 volt and a timer.
9. Concrete board, 4×6 feet (wonder board) works well.
10. Tile and grout and some sealer.
11. PTC heaters, 12 to 220 volt AC/DC 430 f. 30 watts each.
12. High heat Silicone 500+ degrees F. (stove section hardware store).
13. Perlite, (used in potting soil) insulation. High heat fiberglass.
14. Float valves for maintenance of desired source water depth.

In order to assemble the apparatus 800 the first step is to cut out the top wall of 810, the first and second end walls 802 and 808 and the first and second side walls 804 and 806. Then a template is made using the caps from the ends of the tubes 814 with the template being a straight flat length of wood, shaped by a yard stick. The caps are attached to the length of wood with a little space in between them to allow a flow of air around the tubes 814 when they are assembled. The next step is to cut out circular holes in the sheets of Plexiglas that make up the first and second side walls 804 and 806. The circular holes can be cut out from the side walls to the same diameter of the tubes 814. Allowance should be made for space under the bottom set of tubes 114 for the receptacles 834, 836 that hold the impure water and for the drip edges (ledges 818 and 820) on the inside surfaces of the side walls 804, 806, and any droplets on the end walls 802, 808. Furthermore, a little room should be allowed for the volume of the float valves if they are used in the receptacles 834 and 836. The caps that were fastened to the outer stick can be used as a guide for the hole cutting, out of the side walls 804 and 806. After the size of the top wall 810 has been established and each of the side walls and end walls have been bonded together, the tubes 814 can be cut to length between the side walls 804 and 806 and then inserted and glued in place against the side walls. In this situation a plastic glue can be used and it is necessary to make sure that the seal around the ends of each of the tubes 814, where they meet the side walls 804, 806 is solid around each tube 114 to keep insects out of container 801 and to keep the humidity inside the container 801.

The next step is to use a small amount of a high heat silicone glue to glue the heaters, in this case PTC (Positive Temperature Coefficient) heaters that are self-regulating heaters, to the bottom of the receptacles 834 and 836. The PTC heaters can be directly connected to solar panels in series or parallel depending on the desired voltages. Twelve units at 30 watts each equates to 360 watts of power, so that a 350 watt power can handle up to twelve heaters. If power is required to run continuously 24 hours a day 7 days a week, the power source panels can be increased in number and a battery bank can be built to handle the power requirements.

The next step is to drill and install the plumbing for flushing the receptacles or trays 834 and 836, in order to avoid salt and mineral build up in the trays. The receptacles 834 and 836 are then fitted to a concrete board, which acts as part of the base portion 24. Silicone glue can be used to make a seal to retain the moisture in an upper section of the receptacles 834 and 836. An overhang of 1 inch around the top parts of the receptacles 834 and 836 may be used to improve the heat retention within the receptacles. The receptacles are then fitted within a frame that holds insulation in the base portion 24. Silicone glue can be used with some screws to fit the trays to the frame. Perlite is generally used as an insulator to fill and be positioned around the receptacles in order to have increased insulation for quick evaporation of the pure water in the receptacles. Perlite is an organic material used in potting soil and is ideal for high heat insulation. The fibreglass insulation and plumbing tubes are then applied or fitted. The fibreglass should be packed tightly as possible around to keep the Perlite in place. A fibreglass mesh can be glued in over the receptacles and Perlite keeping a good seal and using a high heat silicone glue. All of this is within a wooden frame. The remainder of the concrete board or base portion can be attached to the bottom of the wooden frame using silicone glue and screws. Legs as well as an aluminium cover could be used over the top of the wood frame. Rather than using two trays or receptacles, a single tray can be used. A fan may be used to increase its capacity to handle the additional tray.

An aluminium channel can be used as the frame to fit the end walls, side walls and top wall together.

The first and second collection devices 816 and 822 are then fitted and a heat striping gun can be used to create the V-shape in the devices. Silicone glue can be used under the ledges to provide an ideal seal to ensure that there is no loss of distillate or condensate. The overlap between the ledges 818, 820 and the edges of the first collection device 816 should be at least an inch and should cover the receptacles, in order to keep all of the distillate on the collection devices. A layer of tiles 839 can be set in place in the lower part of the container 801 on the surround 837, around the receptacles 834 and 836 and sealed in place. Float valves can also be used in each of the receptacles 834 and 836 to control the level of impure water in the receptacles. The floats can be made of metal in situations where the source water is running low and to prevent melting of the floats. For the timer to initiate a cleaning flush, an inexpensive RainBird™ timer and solenoid valve can be used. The cleaning flush is needed to avoid a build-up of salt in the receptacles.

In operation the reservoirs or receptacles 834 and 836 are filled with impure water 847 such as sea water, which is subsequently heated by the means already described in other embodiments, and in this embodiment by PTC heaters 845 that are secured to the bottom of each receptacle 834, 836. The gaseous water molecules move to the top section of the container 801 and move around all of the individual tubes 814. In a further embodiment there may be a small gap between the ends of each tube and the respective sides 804 and 806, a small gap between the first end 802 and respective tubes 814 near that end, and a small gap between the second end 808 and respective tubes 814 near that end, so that the tubes 814 are suspended, but interconnected with each other and to top wall 810. The water molecules condense onto the exterior surfaces of the tubes 814 and can also condense on the underneath side of sections 816A and 816B of the first collection device 816 as well as on the underside of the second collection device 822 on the sections 822A and 822B. Condensation may also form on each inside surface of ends 802 and 808 and on the inside surfaces of the sides 804 and 806.

The droplets formed by the condensation from each of the tubes 814 will drop onto the upper surfaces of the first collection device 816. Any droplets from the upper inside surfaces of the sides 804, 806 of the container 801 will form or drop onto the ledges 818 and 820 which then subsequently drop onto the top surface of the first collection device 816. Condensate from the upper inside surfaces of the first and second ends 802, 808 will drop onto either the ledges 818, 820 or onto the first collection device 816. Any condensation that forms on the underneath surface of sections 816A and 816B will by gravity drop onto the upper surface of the second collection device 822. The second collection device 822 is on a small acute angle, angled downwardly, with respect to the container 801, from second end 808 towards the first end 802. The collected droplets will then follow the angled second collection device 822 to first end 802 where they will drop into the channel 841 through opening 843, and then subsequently out through the collection output pipe 844. Other droplets that have formed in the channel 841 are from the lower parts of the inside surfaces of the sides 804, 806 and ends 802, 808 from around the perimeter of the surround 837 and will also be available for output through the tube 844 to a fresh water reservoir (not shown). All of the droplets that have been collected onto the upper surface of the first collection device 816 will join and be distributed through output pipe 842 to a further reservoir (or the same reservoir). In this manner, there are two outlets for the collected fresh water. The container 801 used in this embodiment has a height of 2 feet, a width of 2.5 feet and a depth of 2 feet, sitting on a base portion 824 having the same dimensions except for a height of just 6 inches. The apparatus 800 is scalable to any size for any desired output of pure, potable water is required.

Figure 9A:
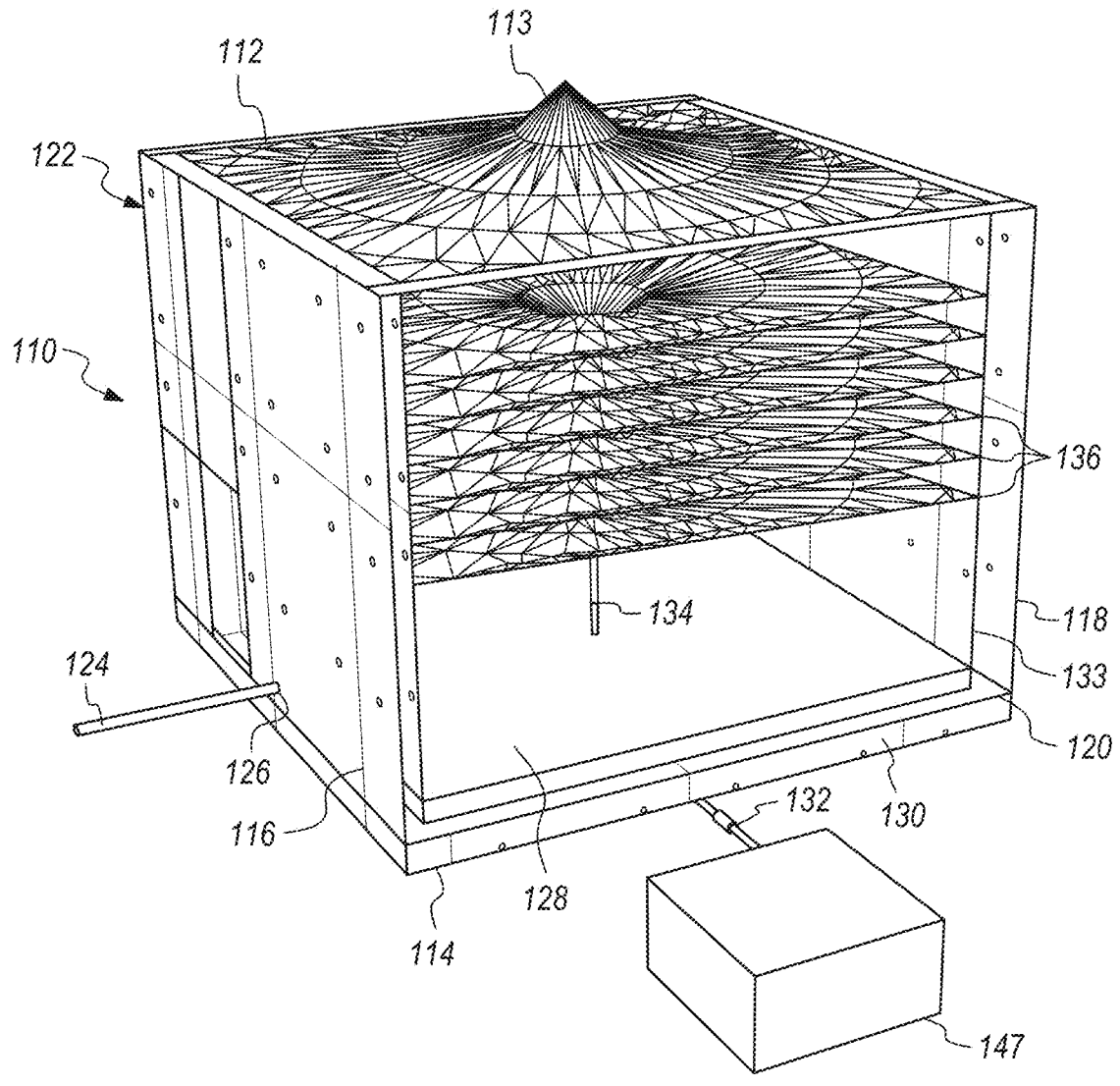
FIG. 9A is a perspective view of a further embodiment of apparatus for removing water from an impure water source.
Figure 9B:
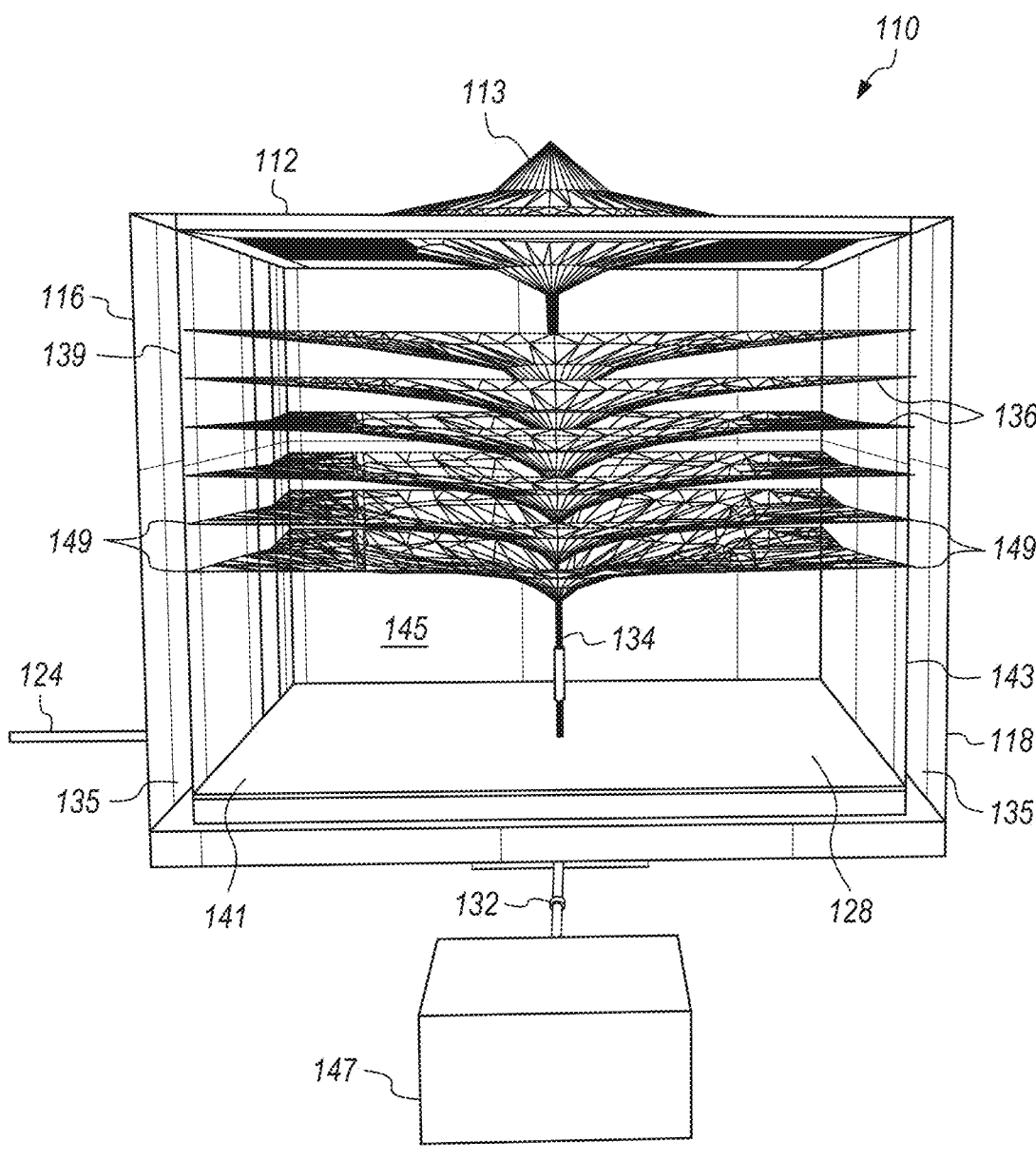
FIG. 9B is a side view of the apparatus of FIG. 8A.
Figure 9C:
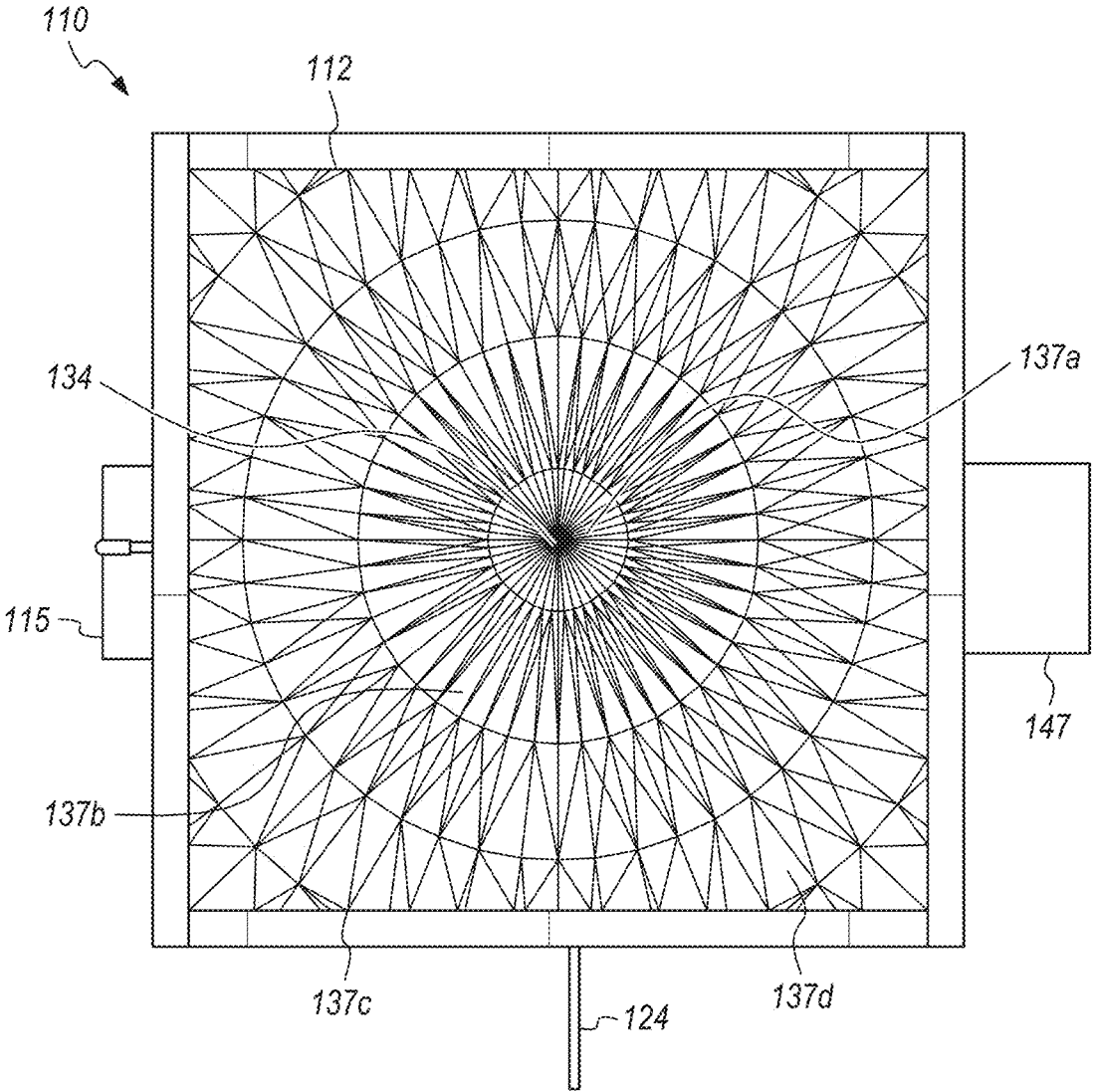
FIG. 9C is a top view of the apparatus of FIG. 8A.

With reference to FIGS. 9A, 9B, and 9C, there is shown an alternative apparatus 110 for obtaining potable water from an impure water source. Container 110 has a top wall 112, a bottom wall 114, first side wall 116, second side wall 118, a first end wall 122 and a second end wall 120 that is not shown, for clarity so that the contents of the container 110 can be more easily viewed. Inside container 110 is another container 133, having sidewalls 139 and 143 and end walls 141 and 145 leaving spaces 135 between the walls of containers 110 and 133.

Impure or contaminated water enters from a source, such as reservoir 82, into inlet pipe 124 at the inlet 126. The body 128 of such contaminated water accumulates at the bottom of the container 110. The body 128 is then heated from beneath in the floor of the container 110 through suitable heating means (not shown) and the water molecules in the body 128 are then evaporated from the body of water 128. Heated fluid can pass under a floor of a building through a series of pipes to radiate the heat to warm the floor or rooms of a home or building, which is called radiant floor heating. As the water vapour molecules rise towards the top of the container 110, they pass through gaps or spaces 135 between the interior surface of the side walls 116, 118 and end walls 120, 122 and the edges 149 of a series of sheets or panels 136 within container 110. The sheets 136 may be in a suspended formation, supported by vertical pipe 134 and walls 139, 141, 143 and 145 to which the edges 149 of the sheets 136 may be partly or fully attached. The walls 139, 141, 143 and 145 have apertures or gaps to enable the water vapour molecules to move from spaces 135 to each of the sheets 136. Each of the sheets 136 can be made from any material that is not permeable to water and tilt downwardly in a direction towards the centre of each sheet 136 where there is a substantially vertical pipe 134 for the collection of condensed water to be fed through an outlet 132 and into a storage container 147. The sheets 136, as well as the collection surfaces 20, 24, 24A, 24B (in container 10 in previous Figures) are made from a material that is safe for potable water, such as plastic, metals, glass, Plexiglas, coated material, polycarbonate panels or fibreglass. All surfaces of sheets 136 can be coated with potable water approved materials. The sheets 136 can be insulated or transparent and provided with drip edges.

Each of the sheets 136 are arranged in a concentric fashion, whereby circular sections (seen in plain view FIG. 9c) 137a, 137b, 137c and 137d are arranged concentrically around pipe or tube 134. All of the sections 137a to 137d angle downwardly with differing degrees of slope to enable the condensed water droplets to run down towards the pipe 134. The innermost circle 137a, being closest to the vertical pipe 134, has an opening therethrough to enable the pipe 134 to protrude through each of the sheets 136. Near the centre of each sheet 136 it forms the shape of an upturned cone, at sections 137a and 137b.

The downpipe 134 has openings at a location close to where it meets or is in contact with each of the sheets 136. This enables the condensed water to run off the sheets 136 and into the downpipe 134 through the openings. At the top of the container 110 there is a similar sheet to 136 that has an upright cone shaped mesh structure 113 in the middle which protrudes upwardly from the rest of the sheet or top wall 112. The structure 113 is a screen to keep leaves and other debris away. A separate pipe (not shown) is used to collect rainwater from top wall 112. The rainwater pipe is also mounted near the centre of surface 112 and acts as a funnel and is positioned inside the container 110. The rainwater pipe is angled towards the inside surface/wall of container 110 and then protrudes through one of the walls, for the water to then be collected in an outside container (not shown). The material chosen for each of the sheets 136 is such that water can condense onto the bottom surface (which can fall onto a lower positioned sheet 136) and the top surface of the sheets 136 and be collected for distribution down the pipe 134. The sheets 136 act as a condensing system and a collection device of water condensate. Any residual impurities such as salt can be collected in receptacle 115 seen in FIG. 8C.

Any of the surfaces of condensate collection, such as the conduit system 20 or collection device sections 24A, 24B or sheets 136 can be hydrophobic to repel or direct condensate to a particular collection point or can be hydrophilic to attract the condensate in a particular direction to be collected.

Figures 10A, 10B:
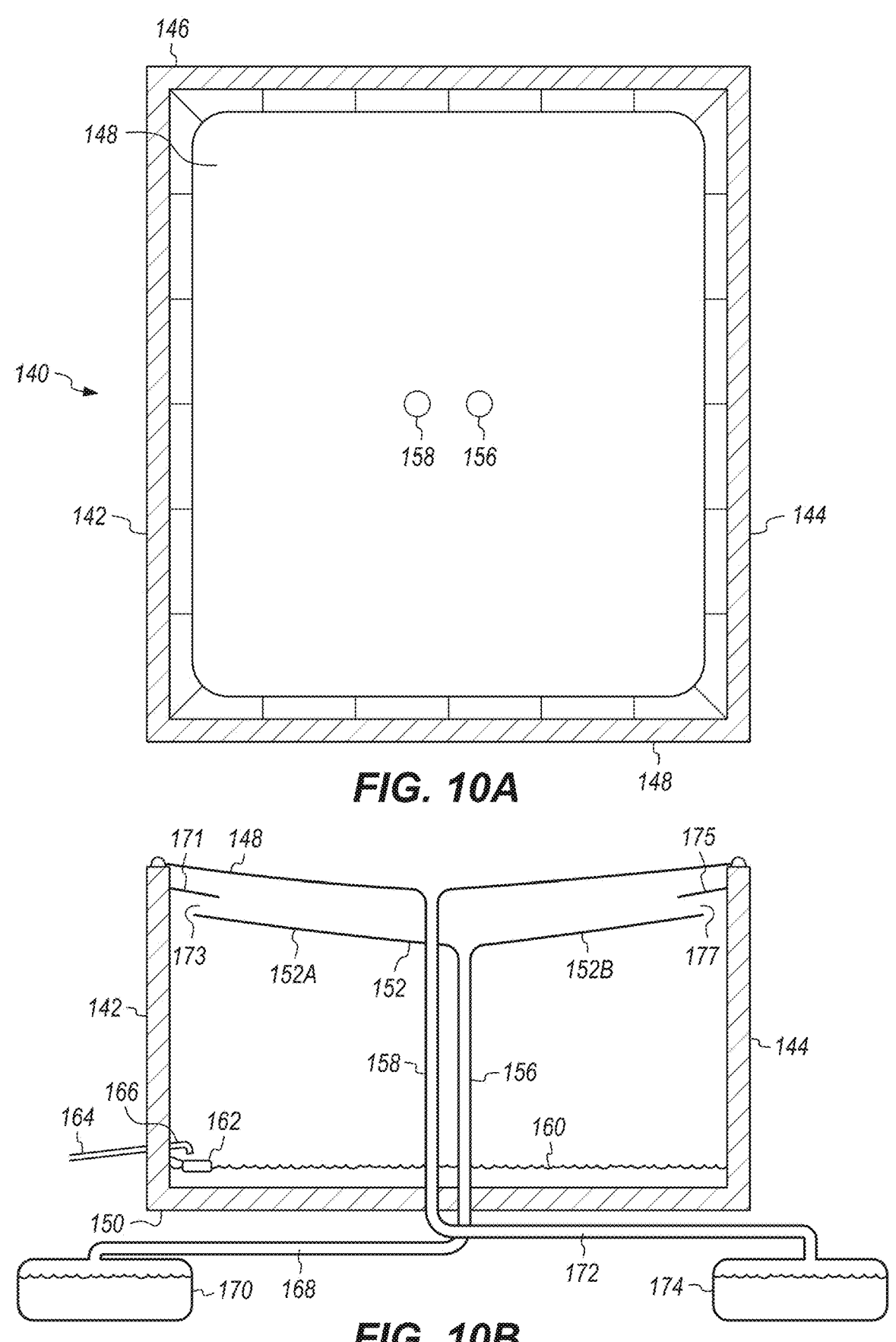
FIG. 10A is a top view of a further embodiment of apparatus for removing water from an impure water source.
FIG. 10B is a side sectional view of the apparatus of FIG. 9A.

Referring to FIGS. 10A and 10B, there is shown an alternative apparatus for removing water from an impure water source. It is a passive solar flat top water still having container 140 that has first side wall 142, second side wall 144, first end wall 146, second end wall 148 as well as bottom wall 150 and sheet 148 that serves as a top wall. The outside surface of top wall 148 is used to collect rainwater that falls onto that surface which then travels downwardly through first downpipe 158 and first (horizontal) pipe 172 to be collected in a reservoir 174.

A body of impure water 160 is input through inlet 166 in the first side wall 142 from pipe 164. A float valve 162 is used to control the level of the impure water in the interior of the container 140. The body of water 160 is heated, through a solar panel array, and the evaporated water vapour molecules rise to be collected in the upper part of the container 140. A suspended collection device 152 in two sections, 152A and 152B, with each section 152A and 152B angled inwardly, provides upper and underneath surfaces for the collection of the water vapour once it has cooled. The interior surface of top wall 148 is also used for this purpose. First and second projections or ledges 171 and 175 provide first and second openings 173 and 177 respectively for the water vapour to travel through to upper parts of the container 140. The condensed water is then collected off the top surface of sections 152A and 152B, and underside of top wall 148, to then travel through second downpipe 156 and through second (horizontal) pipe 168, to be stored in reservoir 170. Therefore, the fresh water provided in containers 170 and 174 is able to be used thereafter.

Figure 11A:
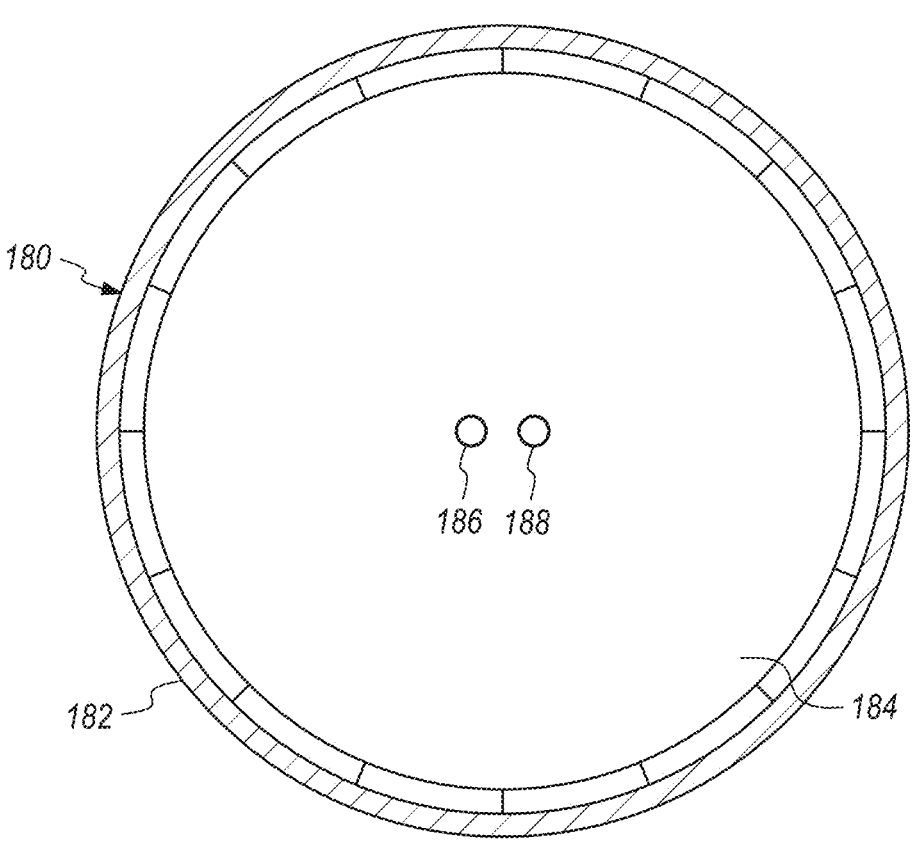
FIG. 11A is a top view of a still further embodiment of apparatus for removing water from an impure water source.
Figure 11B:
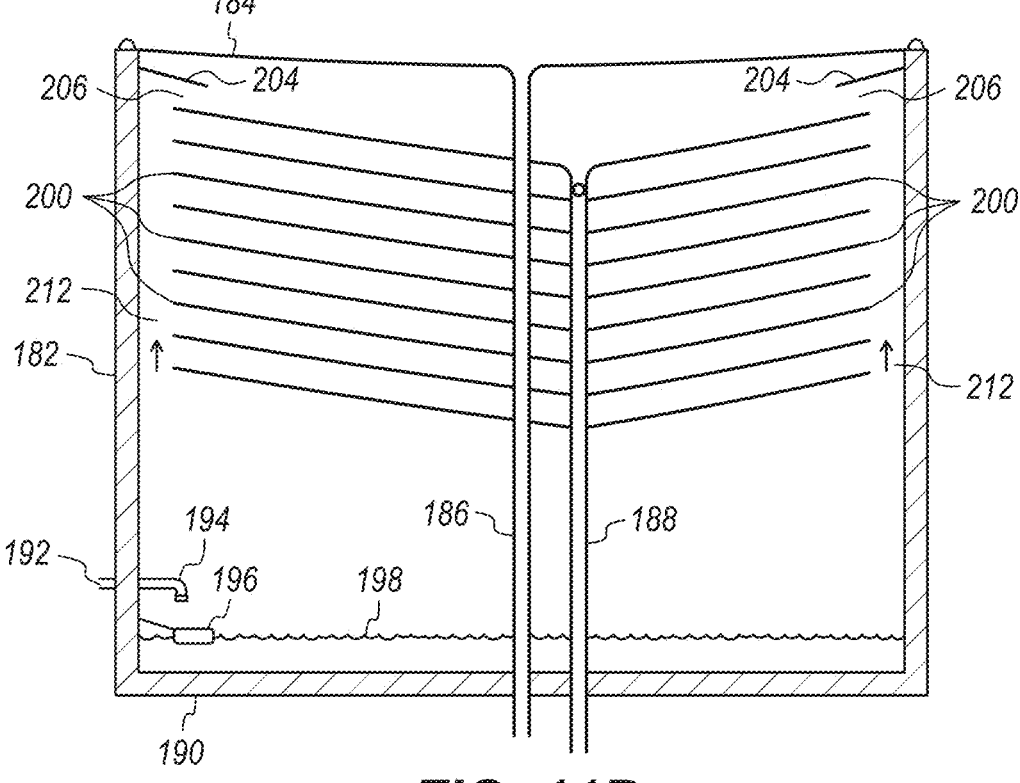
FIG. 11B is a side sectional view of the apparatus of FIG. 10A.

With regard to FIGS. 11A and 11B there is yet a further embodiment, similar to that shown in FIGS. 10A and 10B, except that this is an example of a cylindrical container 180 that has a single side wall 182 and bottom wall 190. It also has a surface that acts as a top wall 184 which is used to collect rainwater to be distributed down the vertical first downpipe 186 into a suitable storage container. Inside the container 180 is a series of angled circular panels 200 each of which are generally parallel to one another and are angled towards the interior and specifically toward second downpipe 188 to collect condensate. A body of impure water 198 is delivered into the bottom of the container 180 from inlet pipe 192 and through inlet 194. A float valve 196 is used to control the level of the body of impure water 198. Upon heating the impure water 198, the resulting molecules rise and travel upwardly through the gap or opening 212, past the inside of the wall 182 to then be cooled in the upper layers and form as condensate on the top and bottom surfaces of each of the panels 200 as well as the inside surface of the top wall 184. Circular projection or ledge 204 provides a circular gap 206 to allow access for the gaseous molecules to go to the top of the container 180 to then condense under cool air which can be provided from a separate source.

Figure 12:
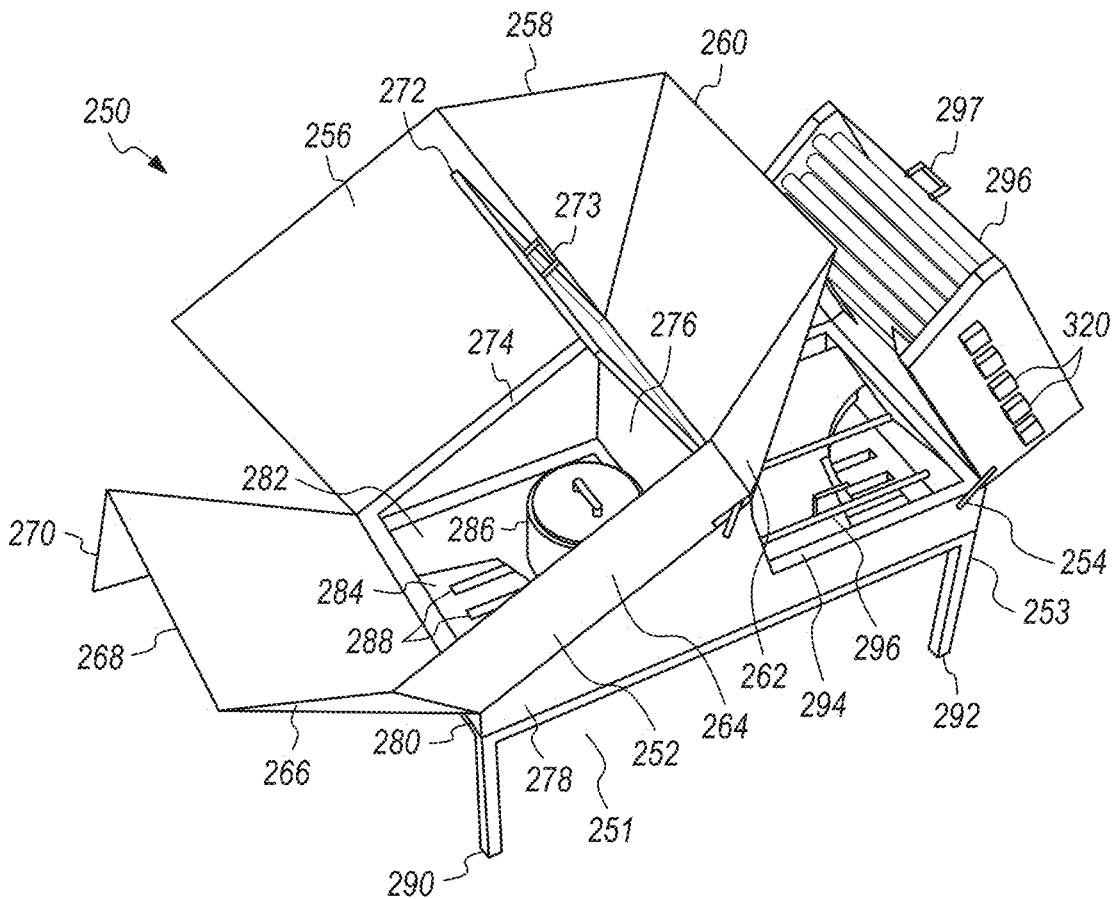
FIG. 12 is a perspective view from above of apparatus for cooking and for obtaining potable water from an impure water source according to a further embodiment of the invention.
Figure 13:
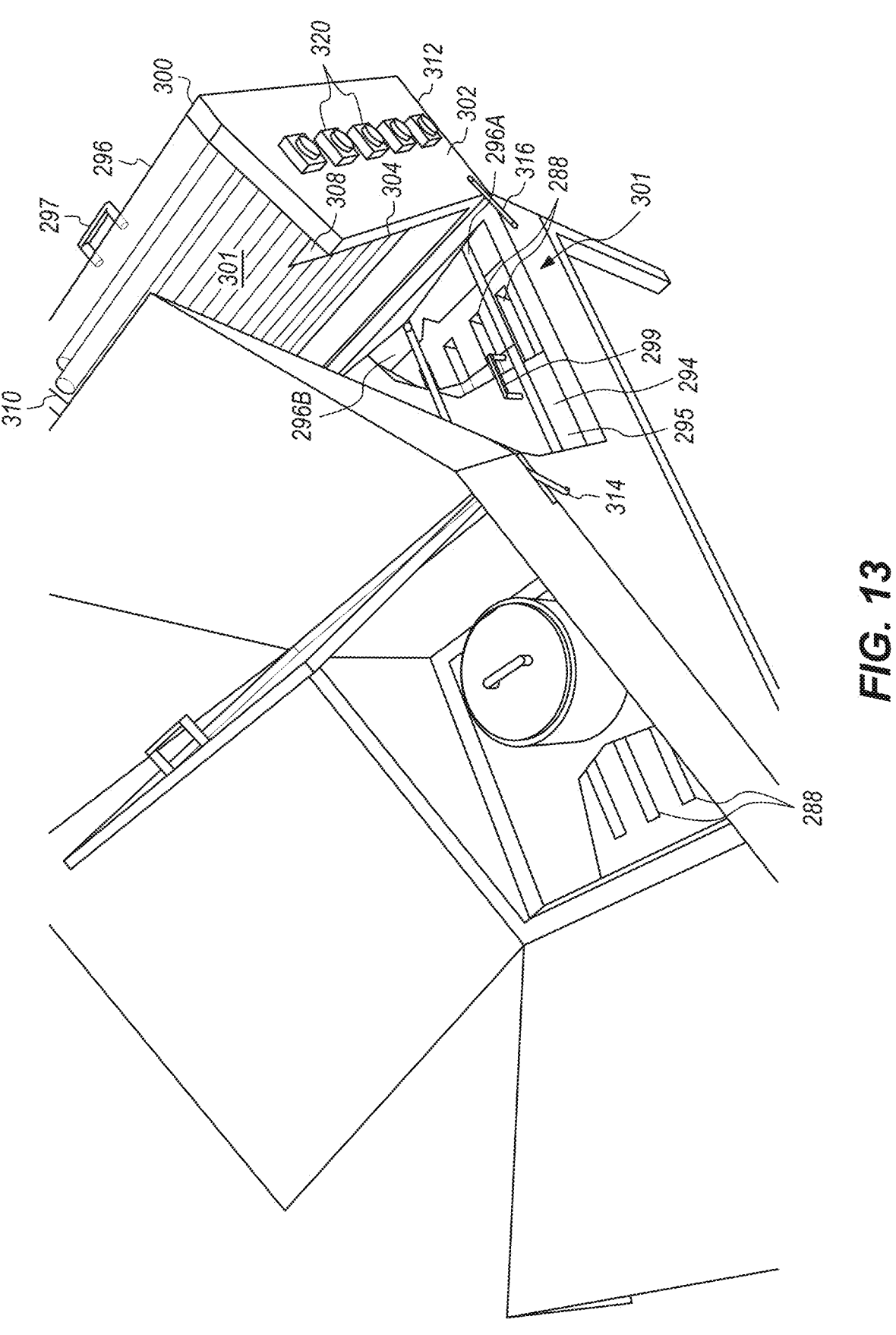
FIG. 13 is a more detailed view of the apparatus of FIG. 11.

Referring to FIGS. 12 and 13 there is shown another embodiment depicting apparatus 250 that obtains potable water from an impure water source and includes a heating and cooking source all in one unit. The apparatus 250 has a solar cooking portion 251 and a distiller or condenser portion 253 from which potable water is able to be derived from an impure water source. The solar cooking portion 251 derives heat from the sun whereby the heat is trapped in the portion 251 to enable food to be cooked or water or be boiled, for example, in pot 286 and it also makes the collected heat available to be transferred to the other side of the apparatus 250, being the condenser portion 253. This is done through a heat transfer fluid which is positioned against a base portion or tray 282 of the cooking portion 251 so that excess heat that is not necessarily used for cooking can be transferred to the heat transfer fluid situated in a number of channels 288 beneath the base tray 282. The heated fluid moves through the channels 288 to the condenser portion 253 (or the fluid can be stationary) to then enhance the evaporation process of the impure water source within that condenser portion 253 of the apparatus 250.

A plurality of reflector panels 256, 258, 260, 262, 264, 266, 268, and 270 are hingedly connected to adjacent panels and to the periphery of the top edges of the solar cooking portion 251. The cooking portion 251 has side walls 276 and 280, front wall 278, and a rear wall 274 and includes the base 282 as mentioned previously. The reflector panels 256 to 270 are optional depending on the heating source and whether additional heat needs to be reflected from the sun on to the panels in order to increase the amount of heat available to the portion 251. A solar external heat panel can also provide enough heat to the cooker base 282 and or to the channels 288. A lid 272 with corresponding handle 273 can be made of glass in order to further trap radiation from the sun within the cooking portion 251 to provide high enough temperatures in order to cook the food and or sterilise items. A cooking pot 286 or any item to be heated is placed on the bottom tray 282 in order to heat food or liquid that is contained in the pot 286.

The heat built up in the solar cooking portion 251, as previously described enables that heat to be transferred from the base plate 282 to each of the channels 288, which generally includes a heat transfer fluid. The heat transfer fluid can be circulated using an electric pump through the various channels 288 to the other side of the apparatus 250, being the condenser portion 253, and in addition can be circulated through a solar heating transfer collector panel, such as a solar water heating panel. This can enhance or elevate the temperature to higher temperatures that could be achieved compared to other solar cookers. The heat that is stored in the fluid within the channels 288 also helps maintain a higher temperature in partially cloudy conditions. The heat transfer fluid used can be a high temperature silicone or oil-based fluid as used in the previous embodiments. It allows the fluid to rise above the boiling point of water and accelerates the evaporation process. The evaporated vapour from the impure water source rises up to the upper part of the condenser portion 253 to cool and condense and then to provide purified water which will be described hereinafter. The apparatus can be used to cook food, sterilise objects or distilled water simultaneously. There is no limit on the direction in which the heat transfer fluid moves within the channels, however the preferred method is from the cooker portion 251 towards the condenser portion 253 and then back again, recirculating to the cooker portion 251. The size of the channels 288 is chosen in accordance with the movement and size of the heating panels, the heat source, and the pumping capability of the system. The channels 288 can be multiple directional pipes as is shown in FIGS. 12 and 13 or can be designed as a continuous zig zag arrangement in a single tube. It can also be a closed loop system or can be used with an insulated fluid storage tank for use at night for a continuous 24-hour operation.

Regarding the condenser portion or distiller portion 253, the design has the same principles as the previous embodiments in the previous figures. It has an upper section 300 which is hingedly connected to a lower section 301 where the lower section is essentially an extension of the solar cooking portion 251. The channels 288 extend all the way through to the condenser portion 253 from portion 251 and are situated below a base portion 294 which holds impure water, to be described hereinafter.

The upper section 300 has a top side 296, a first side 306, a rear side 310, a second side 312, and a front side 302. Located in the main body of the upper portion 300 is a condensing system in the form of a series of parallel tubes 311, which are similar in arrangement to previous embodiments.

Figure 14:
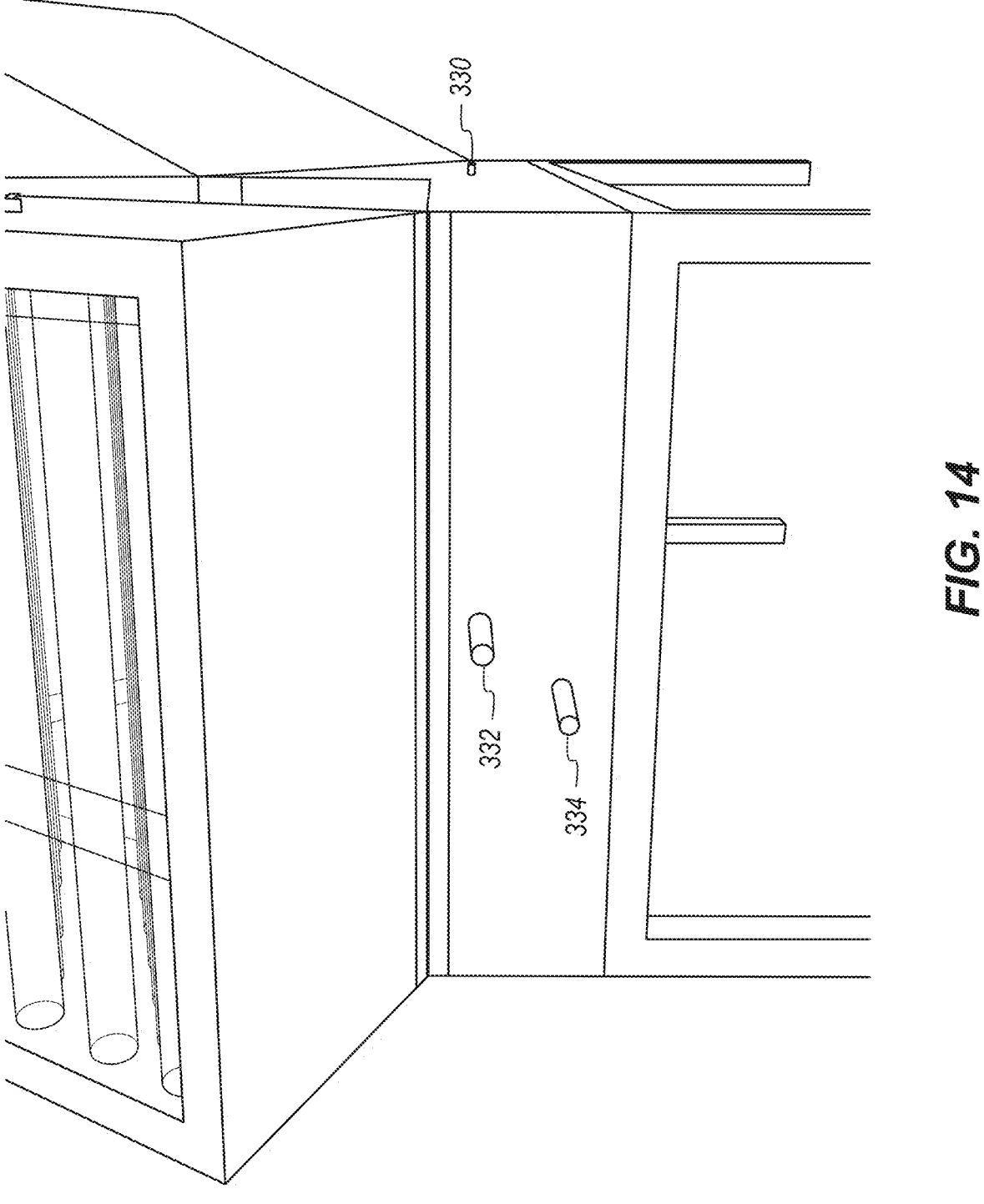
FIG. 14 is a first side perspective view of the apparatus of FIG. 11.
Figure 15:
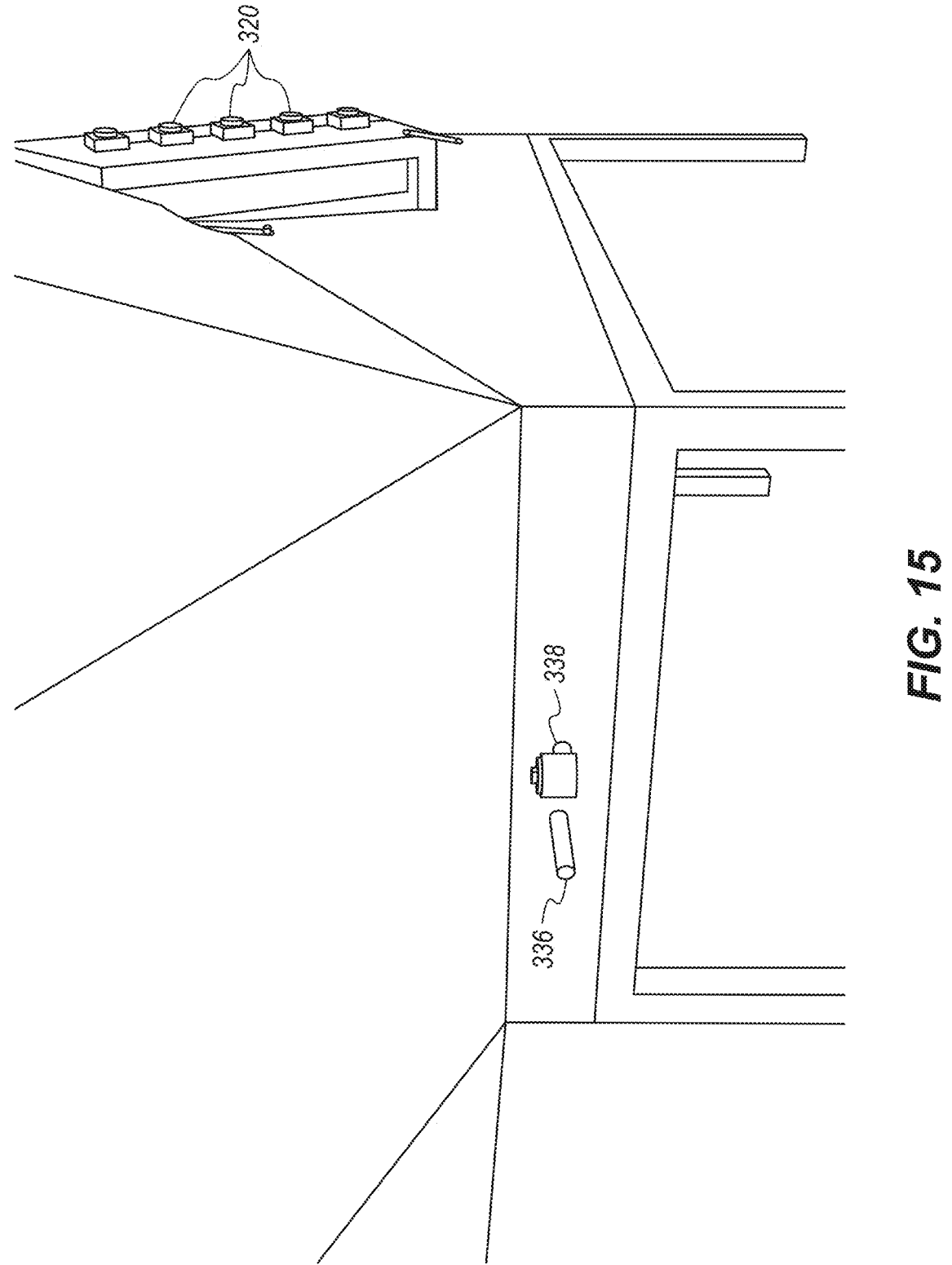
FIG. 15 is a second side perspective view of the apparatus of FIG. 11.
Figure 16:
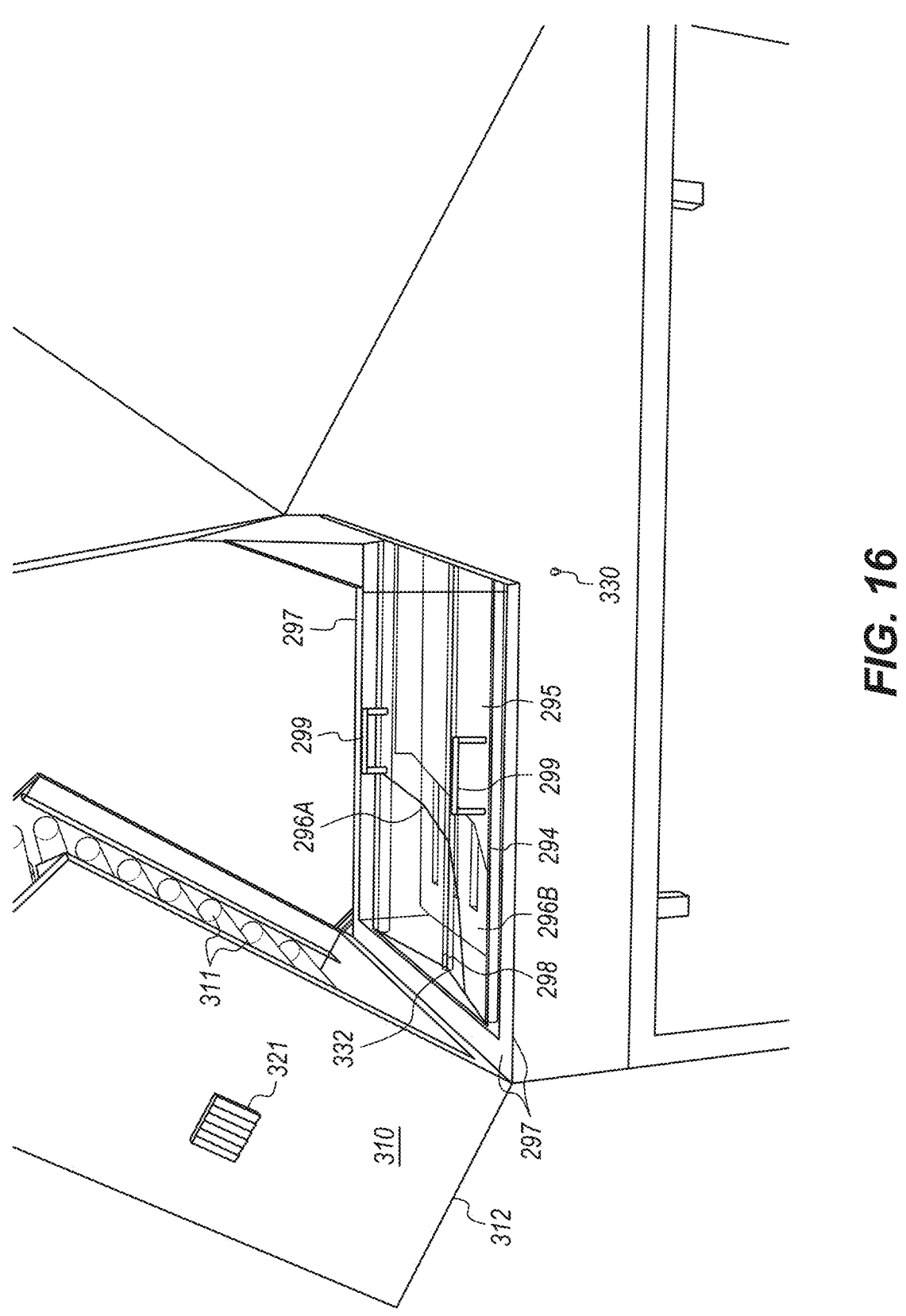
FIG. 16 is a perspective view from behind of the apparatus of FIG. 11 showing more detail of a condenser portion of the apparatus.

Referring to the remaining FIGS. 14, 15 and 16 in particular, the tubes 311 are housed in the upper section 300 and in normal use the upper section 300 would be closed on top of the lower section 301 in which the impure water source and heat source is located. As mentioned previously, the channels 288 extend underneath a base layer and can carry a moving heated fluid which is pumped around the apparatus 250. A body of impure water 295 rests on top of a base portion 294 and is input through inlet 330 from a source of impure water. Above the base portion 294 and the surface of the body of water 295 is a collection tray 296 formed in two angled sections 296A and 296B. These sections collect purified water from the condensation that forms on the tubes 311 (as described in earlier embodiments) and displaces this water into a central collection channel 298 which then exits the portion 253 through a pipe and outlet 332 (see FIG. 14) to be stored in a receptacle for use as pure clean condensed water. A gap 299 exists at either edge of the collection device sections 296A and 296 B and respective side walls of base portion 294 to enable gaseous water to evaporate and rise upwardly into the upper section 300 where it is subsequently cooled and condenses on the series of pipes 311. The condensed water then drops under gravity onto the collection device 296 to be collected and stored as just described. A natural flow of cooled air from an air-conditioning service may be provided through the tubes 311 and the cooled air flows through each of the vents 320 to the interior of each tube 311. Alternatively, a cooler can provide chilled air through the tubes 311 and this is directed through each of the vents 320. A fan can be used to force external air through the tubes 311 when the temperatures are below the temperature within the condenser portion 253. This can be used in addition to a chilled fluid circulating through the tubes 311.

A vent 321 exists in side 310 of the upper section 300 and acts as an exit point for the cool air that circulates through the tubes 311. This can be used in such cases, or closed in the event of a closed loop cooler for the condensation on the tubes 311.

A float valve can be present in the body of pure water 295 near the impure water inlet 330 in order to control the desired level of impure water to be maintained. It can be omitted if there is no pressurised source in order to maintain the desired level, so that it is maintained manually. The outlet 332 and the associated tube enable purified water to flow to a collection point reservoir or to fill individual bottles. Outlet 334 and its associated tube is a collection point of circulated heating fluid. This pipe is an exit point of the closed loop heat fluid panel of the heat fluid source. Thus it can be pumped around a circuit to be input at the inlet 336 to the cooking portion 251. It is not limited to directional use and depends on desired temperatures.

A heat transfer fluid entry and exit point is located at 338, as a receptacle. It enables extra heat transfer fluid to be placed in the circulation system or to be used as a drain to replace existing heat transfer fluid if required. It is not limited to any particular location, but has to be located higher than the channels 288 or preferably located at the highest point of the solar heat collection panel. Referring to FIG. 16, evaporation of the impure water source in the gaseous state moves around the outside edges of the collection device sections 296A and 296B and also under the drip edges 297 and is then trapped above the drip edges by the tubes 311 to ensure no loss of distillate in accordance with the previous embodiments.

The size of the apparatus 250 ideally is 1 metre in length and 0.75 metres in width. However, this can be scaled up or down, depending on the output requirements. The apparatus 250 can function with a pump to transfer the heated fluid or it can have a stationary heated fluid remaining in the channels 288. Even if the fluid remains static it can still provide transfer and storage for heat to the condenser portion 253.

The apparatus 250 is primarily for the use of providing water purification, desalination, and the ability to cook food without an external source of electricity or other fuel. However, it is not limited to this as an external source of electrical power and heat can be used as needed or desired.

The apparatus 250 can be used on a personal level to save funds on fuel and electrical sources, to keep a zero-carbon footprint and be used in times of electrical outages. It is used to provide a source of purified water and being able to cook food in developing countries or in military applications as a source of providing cooking and water purification in challenging environments where access to pure water and adequate heating is not available. It makes use of the waste heat from the solar cooking portion 251 to enhance the process of desalination and water purification on a small or scaled up version to provide for a group of people, such as a family, village, or community.

It will be appreciated that variations of the above-disclosed embodiments and other features and functions, and/or alternatives thereof, may be desirably combined into many other different systems and/or applications. Also, various presently unforeseen and/or unanticipated alternatives, modifications, variations, and/or improvements therein may be subsequently made by those skilled in the art which are also intended to be encompassed by the description above and the following claims.

What is claimed is:

1. Apparatus for obtaining potable water from an impure water source comprising:
    a container having at least a first end wall, a second end wall, a first sidewall, a second sidewall and a top wall;
    a volume of said impure water;
    a heater device for heating said volume of impure water to produce gaseous water molecules;
    a condensing system located inside the container for providing water condensate from said water molecules, said condensing system being located above said heater device;
    an outlet for providing a flow of potable water from the water condensate;
    a collection device for collecting the water condensate and moving the water condensate towards said outlet;
    a first ledge connected to said first sidewall at a non-orthogonal angle and extending downwardly from said first sidewall; and
    a second ledge connected to said second sidewall at a non-orthogonal angle and extending downwardly from said second sidewall;
    said first and second ledges being positioned between said condensing system and said collection device;
    said first and second ledges being configured to direct any water condensate from upper parts of said first and second sidewalls or from the periphery of said condensing system onto said collection device;
    said collection device being configured to angle downwardly towards a central part of said collection device, so as to direct the water condensate towards said outlet;
    said collection device being located between said condensing system and said volume of impure water to collect water condensate that falls from said condensing system.

2. Apparatus according to claim 1 further comprising a reservoir for storing said volume of impure water;
    said first ledge being configured to extend downwardly from said first sidewall to cover said reservoir to prevent water condensate from entering said reservoir.

3. Apparatus according to claim 2 wherein said reservoir is located underneath said condensing system.

4. Apparatus according to claim 1 wherein said condensing system is located in an upper part of said container.

5. Apparatus according to claim 4 wherein said condensing system includes a plurality of conduits, each conduit spaced apart from other conduits and adapted to have an outer surface area of each conduit form said condensate.

6. Apparatus according to claim 5 wherein said plurality of conduits are tubes that are parallel and extend in one direction between said first and second end walls or between said first and second sidewalls of said container.

7. Apparatus according to claim 1, further comprising another collection device positioned between said collection device and said volume of impure water, said another collection device adapted to collect condensate that falls from an underneath surface of said collection device.

8. Apparatus according to claim 7 wherein said another collection device is angled downwardly towards a central part of said another collection device, so as to direct the condensate towards a further outlet.

9. Apparatus according to claim 8 wherein said another collection device is angled downwardly from said second end wall to said first end wall towards said further outlet.

10. Apparatus according to claim 2 wherein said reservoir is located underneath said container and is part of a base portion of the apparatus.

11. Apparatus according to claim 2 wherein said reservoir is a series of trays, said trays being arranged in stacks and/or in rows or columns within a lower part of said container.

12. Apparatus according to claim 2 wherein said reservoir is heated by a heat transfer fluid, which resides in a chamber in said reservoir, said heat transfer fluid being at a temperature above the boiling point of the impure water.

13. Apparatus according to claim 2 further comprising a sensor to sense an amount of impurities, left within the volume of impure water said reservoir and to detect saturation within said container.

14. Apparatus according to claim 5 wherein said plurality of conduits is cooled by cool air from an air conditioning source passing through an inside of each conduit.

15. Apparatus according to claim 14 wherein said condensing system has separate materials applied thereto that are hydrophilic and hydrophobic.

16. Apparatus for obtaining potable water from an impure water source comprising:
    a container having at least a first end wall, a second end wall, a first sidewall, a second sidewall and a top wall;
    a reservoir configured to hold a volume of said impure water;
    a heater device for heating said volume of impure water in said reservoir to produce gaseous water molecules;
    a condensing system located inside the container for providing water condensate from said water molecules, said condensing system being located above said heater device and said reservoir;
    an outlet for providing a flow of potable water from the water condensate;
    a collection device for collecting the water condensate and moving the water condensate towards said outlet;

a first ledge connected to said first sidewall at a non-orthogonal angle and extending downwardly from said first sidewall; and a second ledge connected to said second sidewall at a non-orthogonal angle and extending downwardly from said second sidewall;

said first ledge being configured to extend downwardly from said first sidewall to cover said reservoir to prevent water condensate from entering said reservoir;

said first and second ledges being positioned between said condensing system and said collection device;

said first and second ledges being configured to direct any water condensate from upper parts of said first and second sidewalls or from the periphery of said condensing system onto said collection device;

said collection device being configured to angle downwardly towards a central part of said collection device, so as to direct the water condensate towards said outlet;

said collection device being located between said condensing system and said volume of impure water to collect water condensate that falls from said condensing system;

said top wall of said container being configured to collect rainwater, the rainwater being delivered to a water storage vessel through a separate pipe or through a downpipe used to collect condensed water from said condensing system inside said container.

17. Apparatus for obtaining potable water from an impure water source comprising:

a container having at least a first end wall, a second end wall, a first sidewall, a second sidewall and a top wall;

a reservoir configured to hold a volume of said impure water;

a heater device for heating said volume of impure water in said reservoir to produce gaseous water molecules;

a condensing system located inside the container for providing water condensate from said water molecules, said condensing system being located above said heater device and said reservoir;

an outlet for providing a flow of potable water from the water condensate;

a collection device for collecting the water condensate and moving the water condensate towards said outlet;

a first ledge connected to said first sidewall at a non-orthogonal angle and extending downwardly from said first sidewall;

a second ledge connected to said second sidewall at a non-orthogonal angle and extending downwardly from said second sidewall;

a cooking portion; and a condenser portion integrally formed with said cooking portion;

said condenser portion including said container;

said first ledge being configured to extend downwardly from said first sidewall to cover said reservoir to prevent water condensate from entering said reservoir;

said first and second ledges being positioned between said condensing system and said collection device;

said first and second ledges being configured to direct any water condensate from upper parts of said first and second sidewalls or from the periphery of said condensing system onto said collection device;

said collection device being configured to angle downwardly towards a central part of said collection device, so as to direct the water condensate towards said outlet;

said collection device being located between said condensing system and said volume of impure water to collect water condensate that falls from said condensing system.

18. Apparatus according to claim 17 wherein said cooking portion derives heat from the sun to enable said cooking portion to be used for cooking.

19. Apparatus according to claim 18 wherein said cooking portion has a base portion having a plurality of channels storing a heat transfer fluid therein that extend from said cooking portion to said condenser portion, such that when said base portion is heated, said heat transfer fluid transfers heat to said condenser portion, and when the fluid reaches a predetermined temperature evaporation of the impure water volume occurs.

20. Apparatus according to claim 1, wherein said collection device has a first section and a second section, said first section integrally formed with said second section, said first section and said second section being angled downwardly towards one another.

21. Apparatus according to claim 1, wherein said collection device is angled downwardly from said second end wall to said first end wall towards said outlet.

22. Apparatus according to claim 1, further including a first gap between said first sidewall and said collection device and a second gap between said second sidewall and said collection device to enable said gaseous water molecules to move to said condensing system.

23. Apparatus according to claim 8, wherein said another collection device has a first section and a second section, said first section integrally formed with said second section, said first section and said second section of said another collection device being angled downwardly towards one another.

24. Apparatus according to claim 9, further comprising a channel, at said first end wall, and located underneath said another collection device to collect said condensate from said another collection device such that said condensate is directed towards said further outlet.

\* \* \* \* \*